US006240439B1

(12) United States Patent
Hasegawa et al.

(10) Patent No.: US 6,240,439 B1
(45) Date of Patent: May 29, 2001

(54) SYSTEM AND METHOD FOR INDEPENDENTLY EXECUTING PLURALITY OF PROGRAMS FOR CONTROL OF OBJECTS AND RECORDING MEDIUM IN WHICH THE PROGRAMS ARE RECORDED SO AS TO EXECUTE INDEPENDENTLY PLURALITY OF PROGRAMS FOR CONTROL OF OBJECTS

(75) Inventors: Tetsuo Hasegawa; Hideji Kawata, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/928,490

(22) Filed: Sep. 12, 1997

(30) Foreign Application Priority Data

Sep. 13, 1996 (JP) .................................................. 8-243903
Sep. 17, 1996 (JP) .................................................. 8-245040

(51) Int. Cl.⁷ ........................................................ G06F 11/30
(52) U.S. Cl. ............................................ 709/100; 709/224
(58) Field of Search ................................ 395/500, 527; 709/100, 224

(56) References Cited

U.S. PATENT DOCUMENTS

| 3,921,146 | * | 11/1975 | Danco | 703/21 |
|---|---|---|---|---|
| 5,095,522 | * | 3/1992 | Fujita et al. | 709/316 |
| 5,240,419 | | 8/1993 | deGyarfas | 434/322 |
| 5,335,339 | * | 8/1994 | Maejima et al. | 703/21 |
| 5,625,832 | * | 4/1997 | Ohsawa et al. | 712/28 |
| 5,809,282 | * | 9/1998 | Cooper et al. | 709/226 |
| 5,850,345 | * | 12/1998 | Son | 703/17 |

OTHER PUBLICATIONS

"Guarded Horn Clauses and Experiences with Parallel Logic Programming", Proceedings of the Fall JOint Computer Conference, XXVI+1248, pp. 948–954 (1986).

"The N–Version Approach to Fault–Tolerant Software", IEEE Transactions on Software Engineering, vol. SE–11, No. 12, Dec. 1985.

* cited by examiner

Primary Examiner—Kenneth R. Coulter
(74) Attorney, Agent, or Firm—Banner & Witcoff, Ltd.

(57) ABSTRACT

A system and method for executing a plurality of programs for control of objects, in which states of the objects are first transmitted to the programs. The programs to which the states of the objects are transmitted are then independently executed. The executed results are evaluated, modified and then transmitted to the objects. Thereby the structure of the programs can be simplified, sequential development of the programs can be realized, and program maintenance can be facilitated. Further, a fault tolerance to bugs on software can be enhanced and perfect operation of the software functions can be realized.

21 Claims, 19 Drawing Sheets

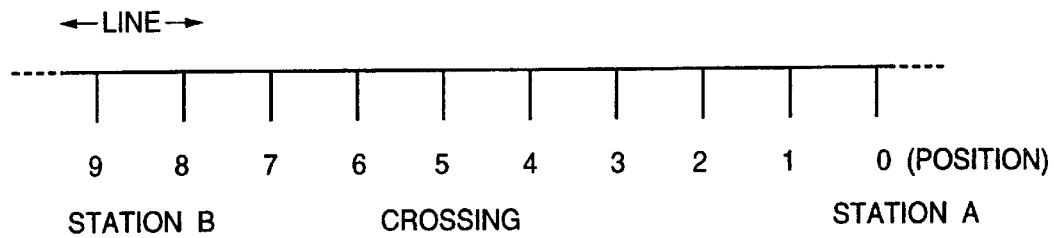
FIG. 7
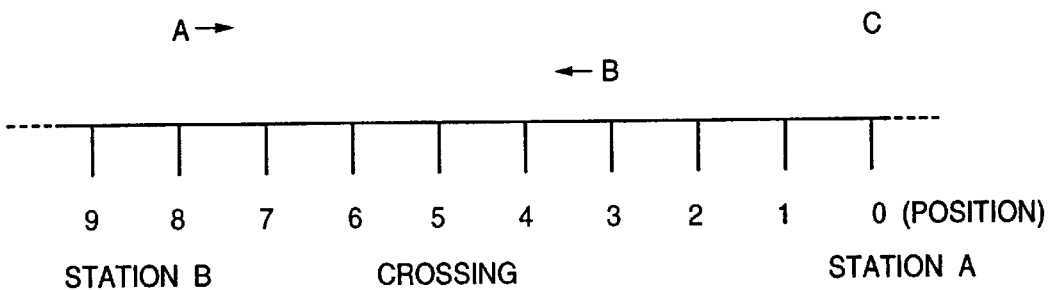
FIG. 8
| REQUEST ORIGINATOR APPLICATION TASK | REQUEST | NECESSITY | MAINTENANCE CONDITION |
|---|---|---|---|
| APPLICATION TASK FOR RUNNING TRAINS ACCORDING TO TIME SCHEDULE | 1 | 1 | 0.1 |
| | | | |
| | | | |
40
FIG. 9

40a

| REQUEST ORIGINATOR APPLICATION TASK | REQUEST | NECESSITY | MAINTENANCE CONDITION |
|---|---|---|---|
| APPLICATION TASK FOR RUNNING TRAINS ACCORDING TO TIME SCHEDULE | 1 | 1 | 0.2 |
|  |  |  |  |
|  |  |  |  |

| REQUEST ORIGINATOR APPLICATION TASK | REQUEST | NECESSITY | MAINTENANCE CONDITION |
|---|---|---|---|
| APPLICATION TASK FOR RUNNING TRAINS ACCORDING TO TIME SCHEDULE | 1 | 1 | 0.2 |
| APPLICATION TASK FOR REDUCING WAIT TIME AT RAILROAD CROSSING | 1.2 | 3 | 0.2 |
|  |  |  |  |

| REQUEST ORIGINATOR APPLICATION TASK | REQUEST | NECESSITY | MAINTENANCE CONDITION |
|---|---|---|---|
| APPLICATION TASK FOR RUNNING TRAINS ACCORDING TO TIME SCHEDULE | 1 | 1 | 0.2 |
| APPLICATION TASK FOR REDUCING WAIT TIME AT RAILROAD CROSSING | 0.8 | 3 | 0.2 |
|  |  |  |  |

| REQUEST ORIGINATOR APPLICATION TASK | REQUEST | NECESSITY | MAINTENANCE CONDITION |
|---|---|---|---|
| APPLICATION TASK FOR RUNNING TRAINS ACCORDING TO TIME SCHEDULE | 0.88 | 2.05 | 2.6 |
| APPLICATION TASK FOR REDUCING WAIT TIME AT RAILROAD CROSSING | 2.18 | 3 | 2.4 |
|  |  |  |  |

| REQUEST ORIGINATOR APPLICATION TASK | REQUEST | NECESSITY | MAINTENANCE CONDITION |
|---|---|---|---|
| APPLICATION TASK FOR RUNNING TRAINS ACCORDING TO TIME SCHEDULE | 0.88 | 2.13 | 2.6 |
|  |  |  |  |
|  |  |  |  |

| REQUEST ORIGINATOR APPLICATION TASK | REQUEST | NECESSITY | MAINTENANCE CONDITION |
|---|---|---|---|
| APPLICATION TASK FOR RUNNING TRAINS ACCORDING TO TIME SCHEDULE | 0.88 | 5.94 | 7.2 |
| APPLICATION TASK FOR AVOIDING COLLISION WITH THE AHEAD-RUNNING TRAIN | 0 | 9 | 7.2 |
|  |  |  |  |

FIG. 16

BELT CONVEYOR A STATE
TRANSITION DIAGRAM

BELT CONVEYOR C STATE
TRANSITION DIAGRAM

BELT CONVEYOR B STATE
TRANSITION DIAGRAM

R1 ARM EXTERNAL DESCRIPTION

R2 ARM EXTERNAL DESCRIPTION

EXTERNAL DESCRIPTION 1

EXTERNAL DESCRIPTION 2 (POSITION OF R1, POSITION OF R2)

EXTERNAL DESCRIPTION 3

SYSTEM AND METHOD FOR INDEPENDENTLY EXECUTING PLURALITY OF PROGRAMS FOR CONTROL OF OBJECTS AND RECORDING MEDIUM IN WHICH THE PROGRAMS ARE RECORDED SO AS TO EXECUTE INDEPENDENTLY PLURALITY OF PROGRAMS FOR CONTROL OF OBJECTS

BACKGROUND OF THE INVENTION

1. Field of the Invention

The present invention relates to a system and method for executing programs for use in software development environment or execution environment, and also to a recording medium in which the execution programs are recorded.

2. Description of the Related Art

As the functions of software are more sophisticated, the software has been made steadily larger and more complicated. For this reason, there occurs such a situation that, only by conventional software development techniques or software structure, it cannot cope with a high level of system sufficiently.

The conventional software concept is based on the fact that, for example, a function of controlling an object is divided into a plurality of sub-functions, a program is developed for each of the sub-functions, and these programs are eventually combined into a single program to control the object.

On such a conventional concept, it is actually impossible to confirm the necessary function before the single combined program is completed. For this reason, it becomes necessary for the developments of the programs of the associated sub-functions to keep pace with each other. This requires much time and much labor in the developing work.

On the conventional concept, further, since the further modification is necessary to prevent the programs of the sub-functions from interfering each other, the combined program has a complicated structure. For this reason, highly complicated works are required for its maintenance.

On the conventional concept, furthermore, when consideration is paid to its reliability in a run mode, it is required, as a matter of course, to already remove bugs in the program at the time of the development. Because of the complicated structure of the combined program, however, bug removal is often incomplete. Accordingly, the software function often works incompletely.

SUMMARY OF THE INVENTION

It is therefore an object of the present invention to provide a system and method for executing programs whose structures can be made simple and also to provide a recording medium for recording therein the execution programs.

Another object of the present invention is to provide a system and method for executing programs whose sequential development can be realized and also to provide a recording medium for recording therein the execution programs.

A further object of the present invention to provide a system and method for executing programs whose maintenance can be facilitated and also to provide a recording medium for recording therein the execution programs.

Yet another object of the present invention is to provide a system and method for executing programs whose fault tolerance to bugs on the software can be enhanced and also to provide a recording medium for recording therein the execution programs.

Still a further object of the present invention is to provide a system and method for executing programs whose software functions can work completely and also to provide a recording medium for recording therein the execution programs.

An additional object of the present invention is to provide a system and method for executing programs that intentions of the programs independently prepared on the basis of the different requests can be reliably reflected on full objects or partial objects to be controlled on the basis of the state at the execution and also to provide a recording medium for recording therein the execution programs.

Another object of the present invention is to provide a system and method for executing programs which can increase a program preparation efficiency and enhance its maintenance and also to provide a recording medium for recording therein the execution programs.

A further object of the present invention to provide a system and method for executing programs, in which restrictions changing in different environments can be added without the need for changing essential parts of the programs and also to provide a recording medium for recording therein the execution programs.

A still further object of the present invention is to provide a system and method for executing programs which can efficiently operate and can be easily prepared and also to provide a recording medium for recording therein the execution programs.

To accomplish the above objects, the present invention is to provide a system and method for executing a plurality of programs for control of objects, in which states of the objects are first transmitted to the programs. The programs to which the states of the objects are transmitted are then independently executed. The executed results are evaluated, modified and then transmitted to the objects. Thereby the structure of the programs can be simplified, sequential development of the programs can be realized, and program maintenance can be facilitated. Further, a fault tolerance to bugs on software can be enhanced and perfect operation of the software functions can be realized.

BRIEF DESCRIPTION OF THE DRAWINGS

The above and other objects, features and advantages of the present invention will become apparent from the following detailed description when taken with the accompanying drawings in which:

FIG. 7 shows a request/condition storage table 40c of the service processor 20 of the train B;

FIG. 8 shows a request/condition storage table 40d of the service processor 10 at a time "2.5";

FIG. 9 shows a request/condition storage table 40e after a column is removed from a state of FIG. 8;

FIG. 10 shows a request/condition storage table 40f when a change is made from a state of FIG. 9 to another state having a newly-added request column of "application task for avoiding collision with the ahead-running train";

FIG. 11 shows a relationship between times and train positions;

FIG. 12 is a flowchart for explaining the operation of a memory means of each service processor;

FIG. 14 is a flowchart for explaining the operation of an "application task for running the trains according to the time schedule";

FIG. 15 is a flowchart for explaining the operation of an "application task for reducing the wait time at railroad crossing";

FIG. 16 is a flowchart for explaining the operation of the "application task for avoiding collision with the ahead-running train";

DESCRIPTION OF THE PREFERRED EMBODIMENTS

Figure 1:
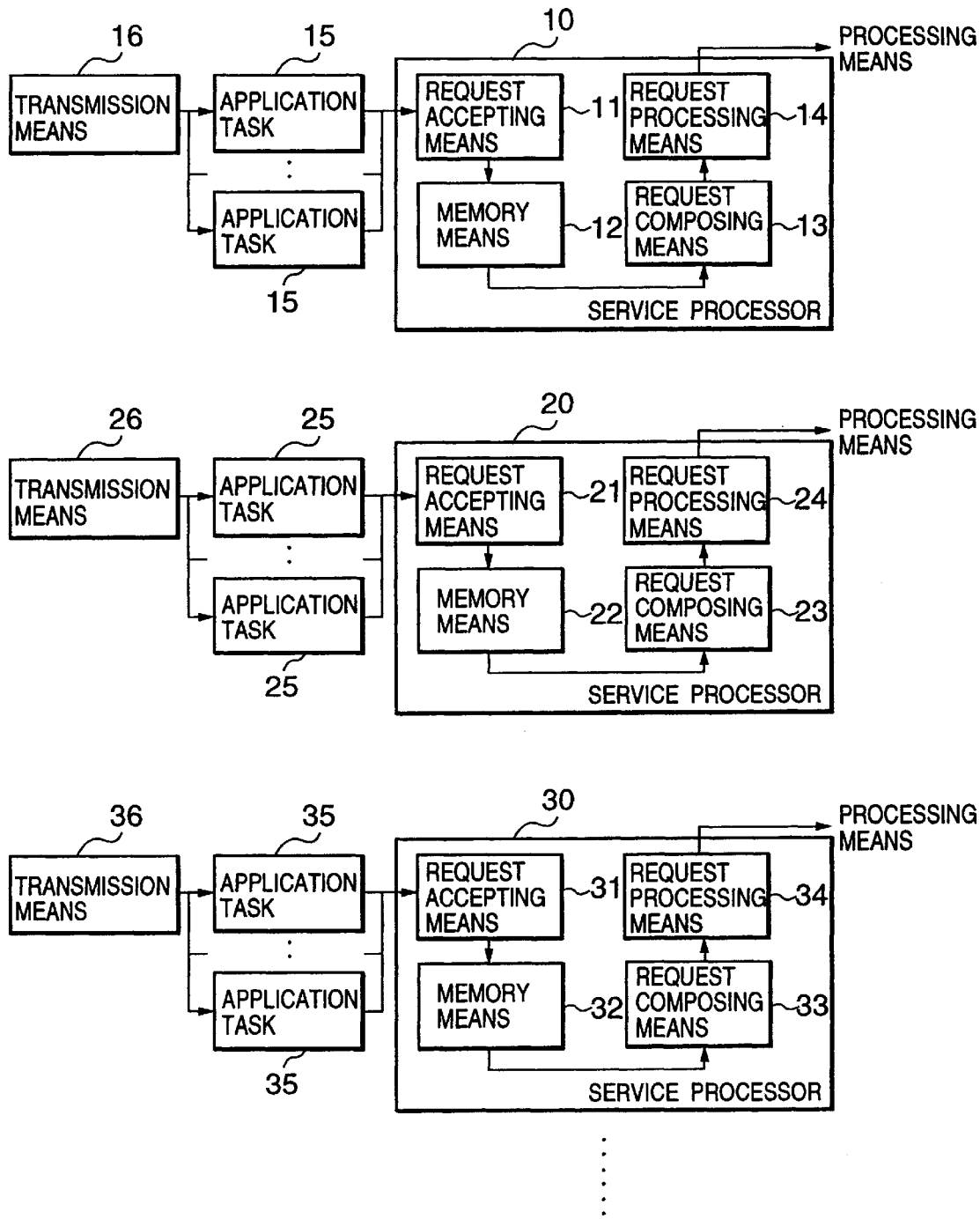
FIG. 1 shows arrangements of service processors used in an embodiment of the present invention.

FIG. 1 shows an aspect of an embodiment according to an arrangement of service processors.

Referring to FIG. 1, there is shown an arrangement of service processors 10, 20 and 30 in accordance with an embodiment of the present invention.

As shown in FIG. 1, each of the service processors 10, 20 and 30 is provided for each of objects to be controlled, e.g., for each of trains.

The service processor 10, which is intended for a train A, includes a request accepting means 11, a memory means 12 for storing therein such additive conditions as request, necessity and maintenance conditions in the form of a request/condition storage table, a request composing means 13 for composing an actually processing request when accepting a new request, a request processing means 14.

The service processor 20, which is intended for a train B, includes a request accepting means 21, a memory means 22 for storing therein such additive conditions as request, necessity and maintenance conditions in the form of a request/condition storage table, a request composing means 23 for composing an actually processing request when accepting a new request, a request processing means 24.

The service processor 30, which is intended for a train C, includes a request accepting means 31, a memory means 32 for storing therein such additive conditions as request, necessity and maintenance conditions in the form of a request/condition storage table, a request composing means 33 for composing an actually processing request when accepting a new request, a request processing means 34.

The request accepting means 11, 21 and 31 accept request, necessities and maintenance conditions to associated application tasks 15, 15, . . . , 25, 25, . . . , 35, 35, . . . , respectively.

The application tasks have programs for controlling the associated object. The programs of the application tasks are designed to receive conditions of the associated objects such as, e.g., speeds or positions from transmission means 16, 16, . . . , 26, 26, . . . , 36, 36, . . . . Each of the application tasks is designed so that the associated program is executed independently for the associated task to which the condition of the associated object is transmitted.

Figure 2:
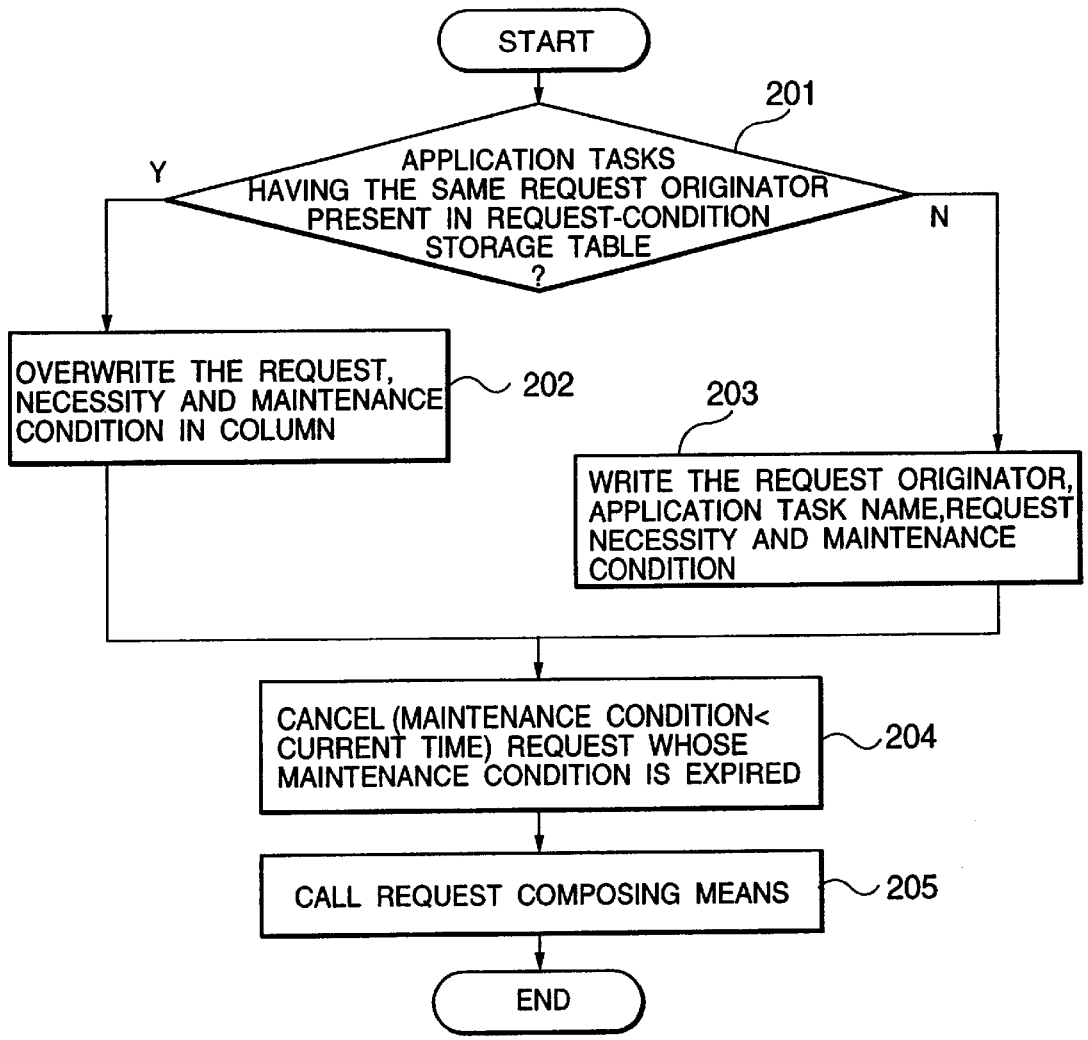
FIG. 2 is a railroad line showing a line state when the service processors are applied to a computer system for control of the operation of trains.

The memory means 12, 22 and 32 are operated as shown in, e.g., FIG. 2.

The memory means judges whether or not there is a request of the same application task in the request-condition storage table (step 201). In the presence of such a request, the memory means overwrites a new request, necessity and maintenance condition in the same column (step 202). In the absence of such a request, the memory means writes a new application task name, request, necessity and maintenance condition in a new column (step 203). And the memory means erases the column associated with a request which maintenance condition is already expired (step 204), and calls the request composing means 13 (step 205).

Figure 3:
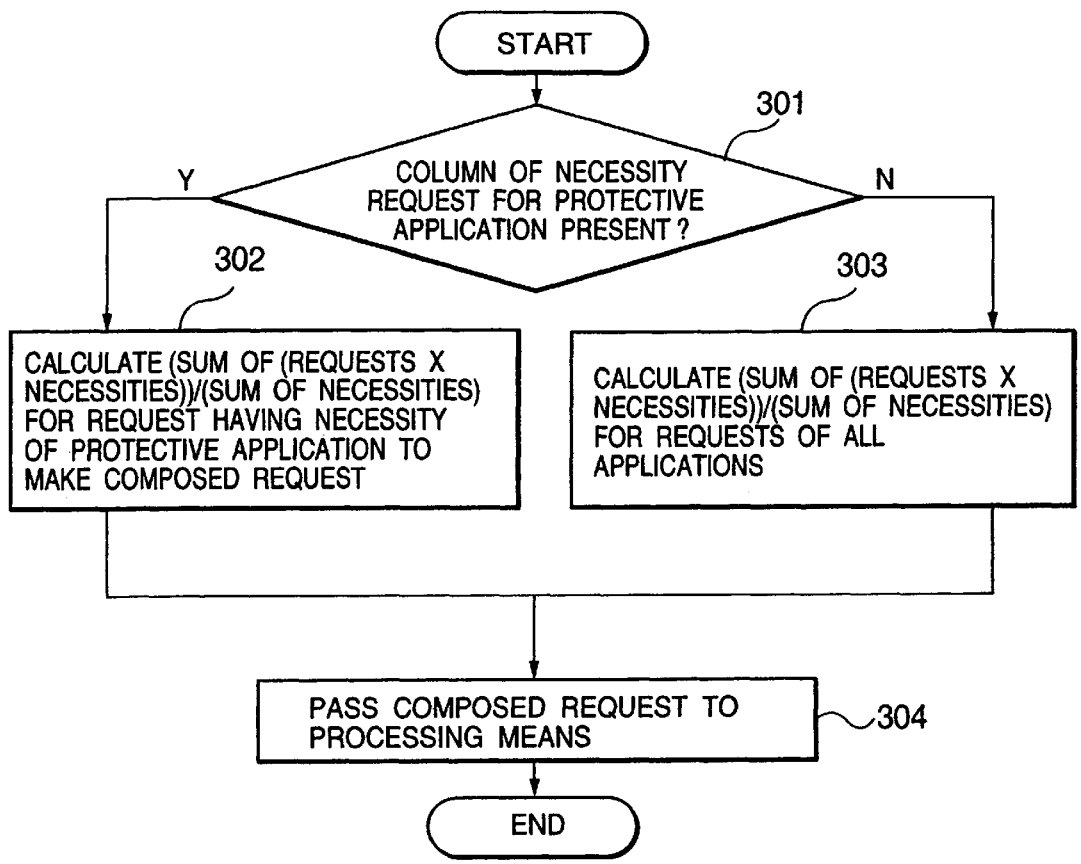
FIG. 3 shows positions of the trains at a time "0" in the line diagram of FIG. 2.

The request composing means 13, 23 and 33, which act to evaluate and modify associated outputs of the memory means, are operated as shown in, e.g., FIG. 3.

The request composing means judges whether or not there is a column of a request for the necessity of the protection application (step 301). In the presence and absence of such requests, the request composing means perform predetermined arithmetic operations for composition over the respective requests, (steps 302 and 303) and pass their results to the request processing means 14, 24 and 34 as composed requests, respectively.

The request processing means 14, 24 and 34 transmit outputs of the request composing means to the associated objects to be controlled.

Explanation will next be made in connection with a case where the present invention is applied to a system for controlling operations of trains.

The service processors 10, 20 and 30 perform service operations over the trains in such a manner that the service processors accept respective speed requests for the associated trains and issue their outputs to associated driving devices of the trains to thereby their current speeds of the trains to the accepted speeds.

The necessities of the respective service processors 10, 20 and 30 are assumed to be in a range of 0–10. In particular, the values of 8 and more of the necessities are used for the protective application tasks. The maintenance condition is, e.g., an expiration time until which a request is maintained.

The application tasks providing requests to the respective service processors 10, 20 and 30 are assumed to be, as an example, such application tasks that the programs are prepared independently on the basis of request specifications from the viewpoints of 3 different sorts of phases. Explanation will be made in connection with a case where the service processors 10, 20 and 30 of the respective trains process contradictory requests received from these application tasks.

The application tasks are operated as follows.

1) Application Task For Running Train According To Time Schedule

Figure 4:
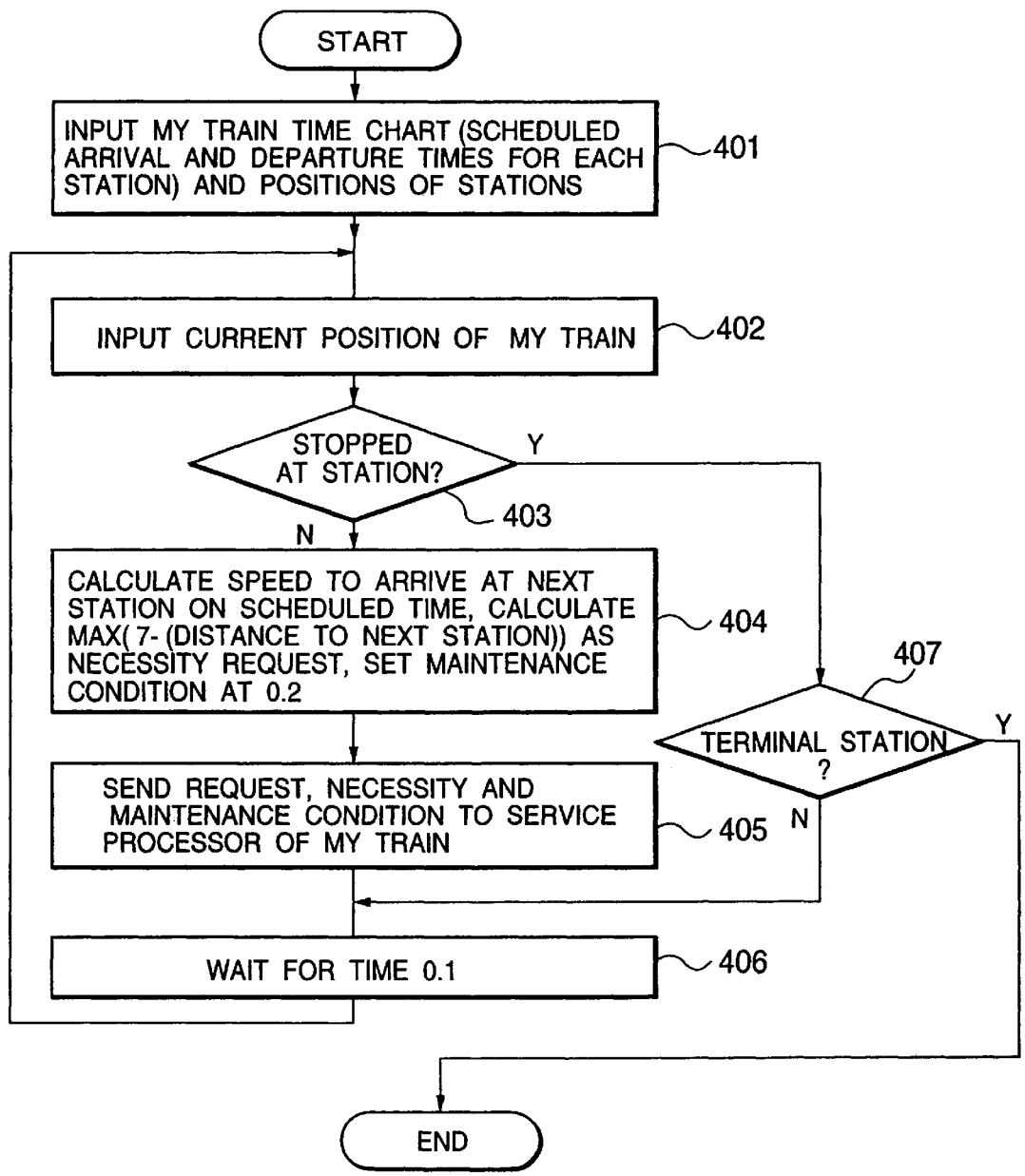
FIG. 4 is a request/condition storage table 40 of the service processors 10 and 20 of trains A and B, showing initial values.

This task is provided one for one train. A user enters in this task a diagram or schedule (predetermined arrival and departure times for each station) and a current position of the train. The task provides, as a request, an optimum speed obtained based on a distance to the next station and a remaining time before the scheduled arrival time to the associated service processor 10, 20 or 30 on a proper frequent basis. In this connection, the necessity of the request is set to be higher as the train comes closer to the station. FIG. 4 shows an example of the operation of the task after the time schedule was entered.

2) Application Task For Reducing Wait Time At Railroad Crossing

Figure 5:
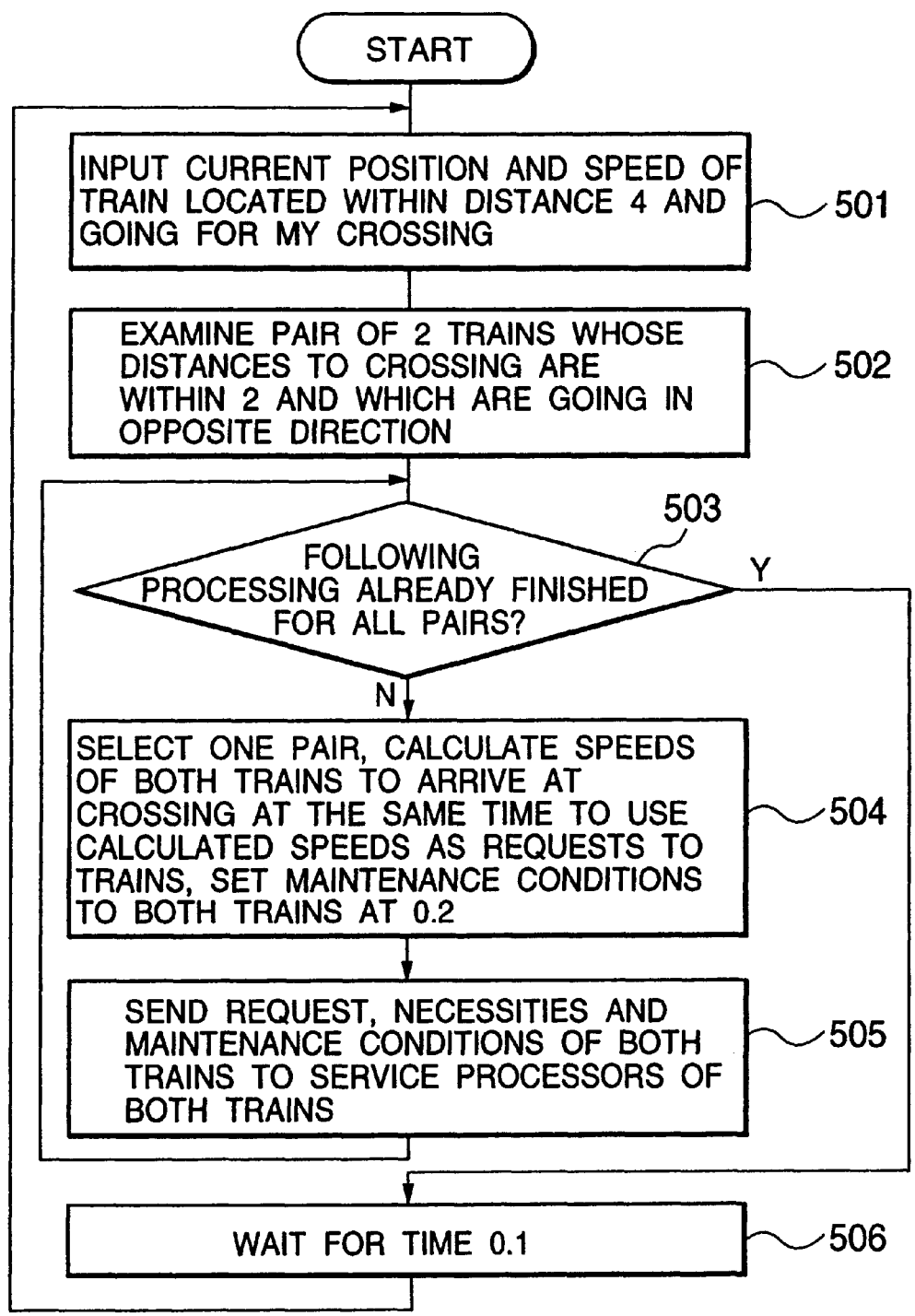
FIG. 5 shows a request/condition storage table 40a when a maintenance condition is changed from a state of FIG. 4.

This task is provided one for one crossing. The user enters in the task a current position of a specific train closing to this crossing. The task also provides to the associated service processor 10, 20 or 30 a request of such a suitable speed that the train closing to the crossing but in the opposite direction to the above train arrives at the crossing at the same time as the other train. An example of the above operation of the task is shown in FIG. 5.

3) Application Task For Avoiding Collision With Ahead-Running Train

Figure 6:
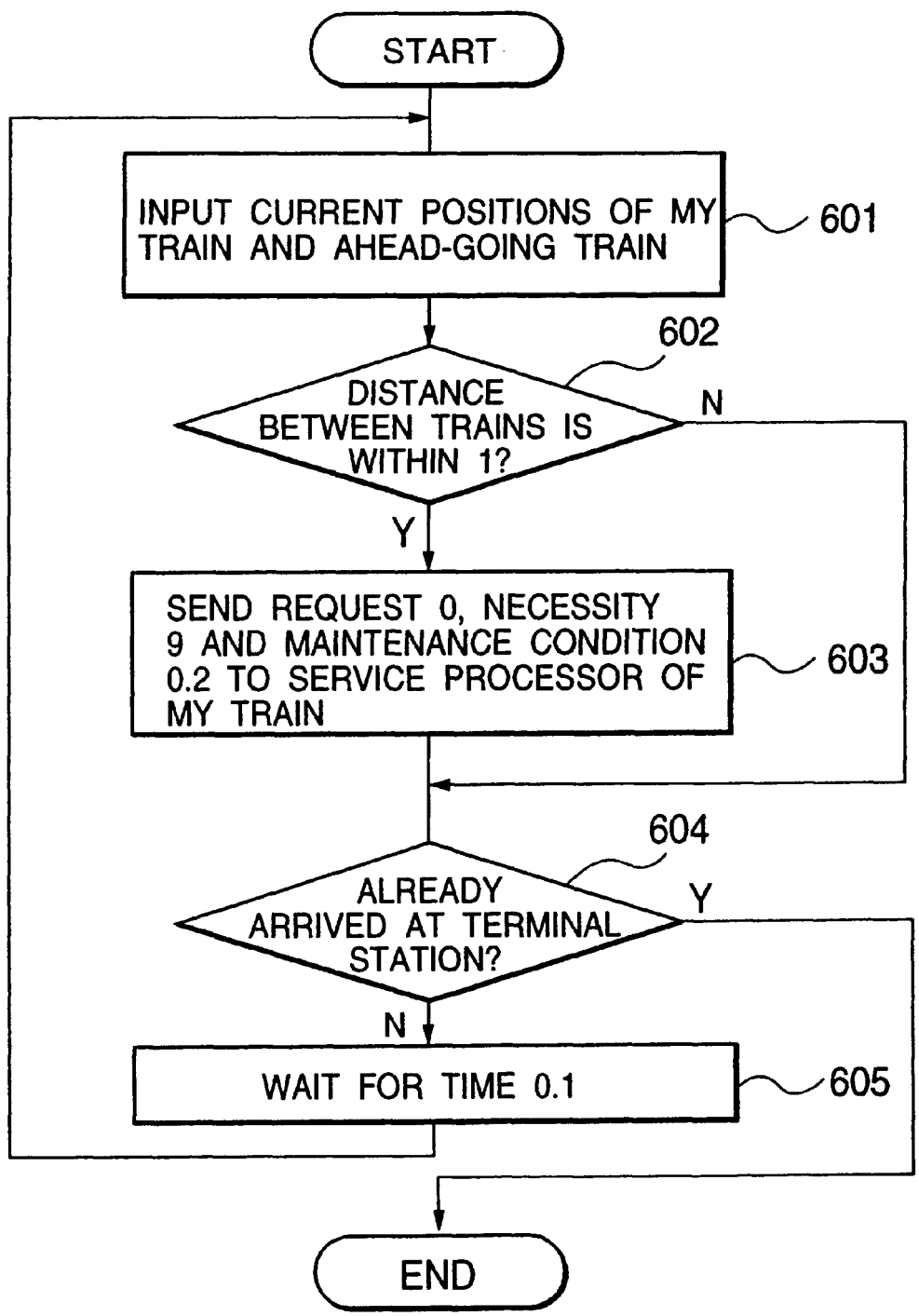
FIG. 6 shows a request/condition storage table 40b when a change is made from the state of FIG. 4 to another state having a newly-added column.

This task is provided one for each train. The user enters in this task a position of my train and a position of the train running ahead of my train. The task issues to the associated service processor 10, 20 or 30 a request of such a speed that my train will not collide with the ahead-going train even when my train comes closer to the ahead-going train. In this case, such a necessity as given in the protection range is provided to the associated service processors 10, 20 and 30. An example of the operation of the task is shown in FIG. 6.

FIG. 7 is a train railroad diagram.

As shown in FIG. 7, it is assumed that a station A is located at a position 0, a station B is located at a position 9, and a crossing is located at a position 5. It is also assumed that there are three trains A, B and C.

Also assumed is that, on schedule, the train A is to arrive at the station A a time 8 later, the train B is to arrive at the station B a time 6 later, and the train C is to leave the station A a time 10 later.

The respective application tasks of the trains A, B and C "for running the trains according to the time schedule" are already started at the time of starting the trains and are executed according to a flowchart shown in FIG. 4.

The respective tasks have the positions of stop stations and the arrival and departure times of the stations already entered and reserved therein (step 401).

The application tasks of the trains A, B and C "for avoiding collision with the ahead-running train" are also already started and running at the time of starting the respective trains.

The crossing application task is already started and running when the system is in operation.

As shown in FIG. 8, at the current time 0, the train A going for the station A is located at a position 8 with a speed 1, the train B going for the station B is located at a position 3 with the speed 1, and the train C is just stopped at the station A.

It is assumed that, as shown in FIG. 9, a column having a task name "application task for running trains according to time schedule", a request of "1", a necessity of "1" and a maintenance condition of "0.2" is already set as their initial values in the request/condition storage table 40 corresponding to the service processors 10 and 20 of the trains A and B.

The "application task for running trains according to time schedule" for the train A inputs the position "9" of my train (step 402), sets the speed of "1" as its request speed for arrival at the next station A on the scheduled arrival time because the train is not stopped at the station (step 403). The task also calculates "1" as its necessity because 7 minus (distance to the next station) is equal to −1, calculates "0.2" (addition of the current time "0" to 0.2) as its maintenance condition (step 404), sends these values to the service processor 10 of the train A (step 405), and waits for a time of "0.1" (step 406).

Similarly, the "application task for running trains according to time schedule" for the train B inputs the position "3" of my train (step 402), sets the speed of "1" as its request speed for arrival at the next station B on the scheduled arrival time because the train is not stopped at the station (step 403). The task also calculates "1" as its necessity because 7 minus (distance to the next station) is equal to 1, calculates "0.2" (addition of the current time "0" to 0.2) as its maintenance condition (step 404), sends these values to the service processor 20 of the train B (step 405), and waits for a time of "0.1" (step 406).

Meanwhile, the "application task for reducing wait time at crossing", as shown in FIG. 5, at the time "0", inputs the position "8" and speed "1" of the train A which is located within a distance "4" from the position "5" of the crossing and which is going for the crossing and also inputs the position "3" and speed "1" of the train B (step 501), pairs the train A with the train B because distances of the trains A and B to the crossing are "3" and "2" respectively and a distance between the distances is not larger than "2" (step 502), calculates as request speeds the speed "1.2" of the train A and the speed "0.8" of the train B necessary for the trains A and B to arrive at the crossing at the same time because there is already created a pair of the trains A and B (step 503), sets a fixed value "3" as a necessity of the both trains, adds "0.2" to the current time "0" as the maintenance condition (step 504), sends the request speed "1.2", necessity "3" and maintenance condition "0.2" to the service processor of the train A, and also sends the request speed "0.8", necessity "3" and maintenance condition "0.2" to the service processor 20 of the train B (step 505).

Since there is no other pair (step 503), the application task waits for a time "0.1" (step 506).

The "application task for avoiding collision with the ahead-running train" of the train A, as shown in FIG. 6, inputs the position "8" of the train A and the position "0" of the ahead-going train C (step 601), and waits for the time "0.1" without making any requests (step 605) because a distance between the trains A and C is larger than 1 (step 602) and the train A does not arrive at its terminal station yet (step 604).

The "application task for avoiding collision with the ahead-running train" of the train B operates in substantially the same manner as mentioned above.

The service processors 10, 20 and 30, when accepting the aforementioned requests, operate as follows.

First of all, the service processor 10 of the train A, when receiving the request "1" and the necessity "1" and maintenance condition "0.2" from the "application task for running the trains according to the time schedule" of the train A through the request accepting means 12, the memory means 12 executes its operation according to the flowchart of FIG. 2. In this case, since there is present a request for the same application task in the request/condition storage table 40 of FIG. 9 (step 201), the task enters the new request "1", necessity "1" and maintenance condition "0.2" in the associated column (step 202).

This results in such a request/condition storage table 40a as shown in FIG. 5.

And the maintenance condition is before the current time "0", i.e., expired and it is unnecessary to maintain the request (step 204), so that the service processor call the request composing means 13 as the request composing means (step 205) and the request composing means 13 performs its operation according to the flowchart of FIG. 3.

In this case, there is no request of 8 or more corresponding to the range of the protective application task as the necessity of the request/condition storage table 40a of FIG. 5 (step 301), so that the request composing means 13 calculates (sum of products of requests and necessities for all application requests)/(sum of necessities for all requests)=(1×1)/1=1 (step 303), passes the calculated result to the request processing means 14 (step 304). The request processing means 14 adjusts its output in such a manner that the speed "1" is obtained.

Immediately after that, when receiving the request "1.2", necessity "3" and maintenance condition "0.2" from the "application task for reducing wait time at railroad crossing", the service processor executes substantially the same operation as above according to the flowchart of FIG. 2.

In this case, since there is no request for the same application task in the request/condition storage table 40a of FIG. 10 (step 201), the service processor enters the request "1.2", necessity "3" and application task name in a new column (step 203). This results in such a request/condition storage table 40b as shown in FIG. 11. Since there is no column having a request of the maintenance condition before the current time "0" (step 204), the service processor calls the request composing means 13 (step 205) and the request composing means 13 executes its operation according to the flowchart of FIG. 3. Since there is no request of "8" or more corresponding to the range of the protective application tasks as the necessity of the request/condition storage table 40b (step 301), the request composing means 13 calculates (sum of products of requests and necessities for all application requests)/(sum of necessities for all requests)=(1×1+1.2×3)/(1+3)=1.15 (step 303), passes the calculated result to the request processing means 14 (step 304). The request processing means 14 adjusts its output in such a manner that the speed "1.15" is obtained.

The service processor 20 of the train B operates in substantially the same manner as above, which results in such a request/condition storage table 40c as shown in FIG. 12. A result calculated from the request/condition storage table 40c, that is, (1×1+0.8×3)/(1+3)=0.85 is passed to the request processing means 24. The request processing means 24 adjusts its output in such a manner that the speed "0.85" is obtained.

In this manner, the "application tasks for running the trains according to the time schedule" of the trains A and B repetitively execute the operations of the steps 402 to 406 at intervals of time "0.1", the "application task for reducing the wait time at railroad crossing" repetitively execute the operations of the steps 501 to 506, and the "application tasks for avoiding collision with the ahead-running train" of the train A and B repetitively execute the operations of the steps 601 to 605.

Figure 13:
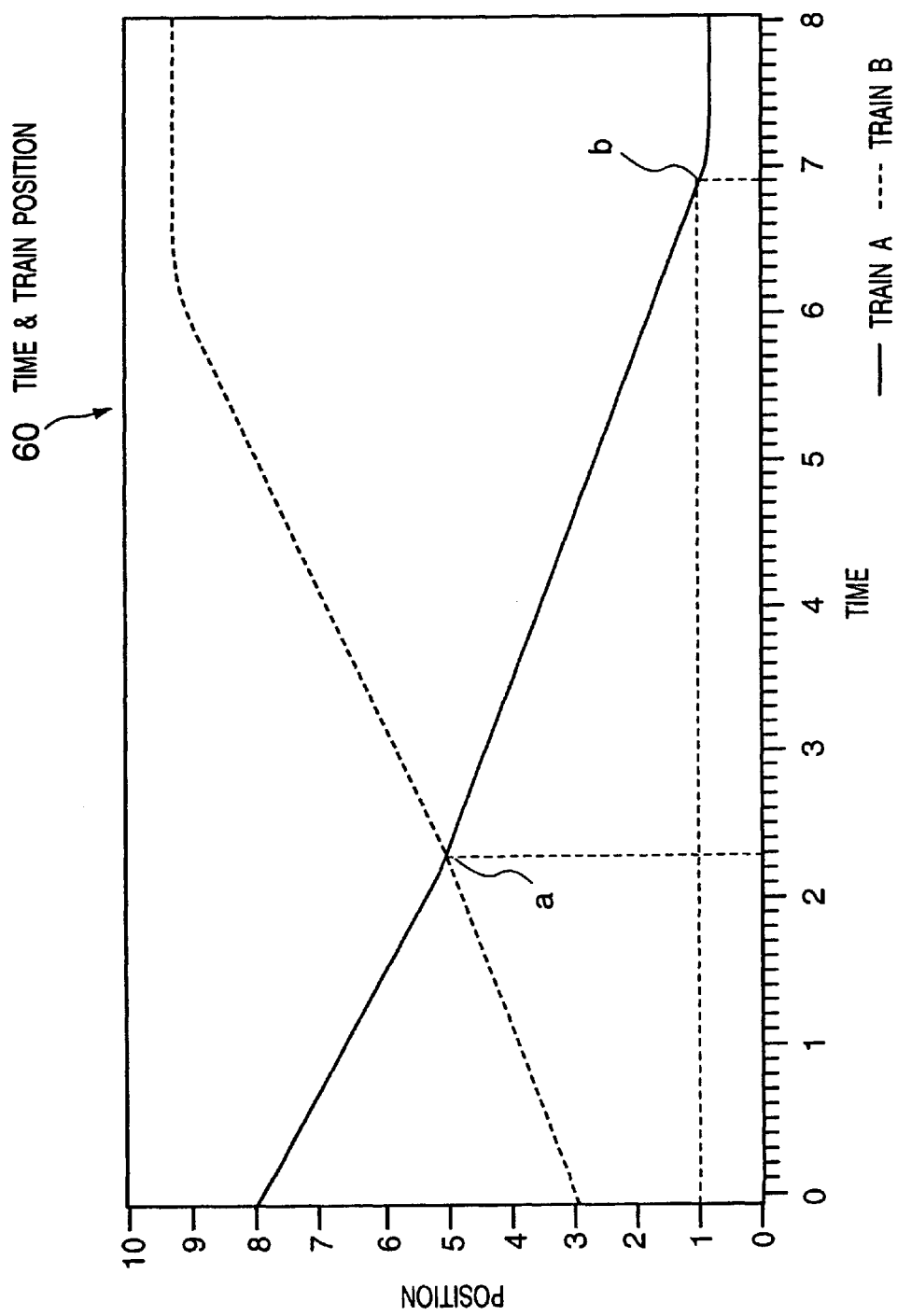
FIG. 13 is a flowchart for explaining the operation of a request composing means in each service processor.

As a result, the trains A and B move from the time "0" to a time "2.3" denoted by a reference numeral 60 showing time and train position in FIG. 13.

That is, the trains A and B pass through the crossing nearly at the same time, i.e., at the time "2.3" (position shown by an arrow a in FIG. 13).

Thereafter, the "application task for reducing the wait time at railroad crossing" executes its operation according to the flowchart of FIG. 5.

In this case, even when the application task inputs the position and speed of the train which is located within a distance "4" from the position "5" of the crossing and which is going for the crossing (step 501), there is no other train and thus no pair is formed (step 502). The application task judges at the step 503 to be "Y" and waits for the time "0.1" (step 506), which procedure is repeated.

Explanation will next be made as to the case of a time point of a time "2.5".

At this time, the service processor 10 of the train A is set to be such a request/condition storage table 40d as shown in FIG. 14, that is, the request "2.18", necessity "3" and maintenance condition "2.4" are entered in a request column of the "application task for reducing the wait time at railroad crossing".

The memory means 12, on the basis of the request/condition storage table 40d, executes the similar operation to the above according to the flowchart of FIG. 2. Since the maintenance condition of the request column of the "application task for reducing the wait time at railroad crossing" is "2.4" that is prior to the current time "2.5", the memory means 12 erases this column (step 204) and calls the request composing means 13 (step 205). This results in such a request/condition storage table 40e as shown in FIG. 15. The service processor 20 of the train B also operates in the similar manner to the service processor 10.

Thereafter, the trains A and B move from the time "2.3" to a time "6.9" denoted by a reference numeral 60 showing the time and train position in FIG. 13.

After that, the position of the train A at the time "6.9" (the position shown by an arrow b in FIG. 13) exceeds "1" and the train C still stops at the position "0", whereby the "application task for avoiding collision with the ahead-running train" executes its operation according to the flowchart of FIG. 6.

The "application task for avoiding collision with the ahead-running train" inputs the position of the train A and the position of the ahead-running train C (step 601), sends the request speed "0", necessity "9" and maintenance condition "7.1" to the service processor 10 of the train A (step 603) because a distance between the trains A and C is smaller than "1" (step 602), and waits for a time "0.1" (step 605) because the train does not arrive at the terminal station yet (step 604).

The memory means 12 of the service processor 10 of the train A, when receiving the above inputs, executes its operation according to the flowchart of FIG. 2.

In this case, there is not request of the "application task for avoiding collision with the ahead-running train" in the request/condition storage table 40e in FIG. 15 (step 201), the service processor 10 provides a new request column of the "application task for avoiding collision with the ahead-running train" and enters the request "0", necessity "9" and maintenance condition "7.1" (step 203). This results in such a request/condition storage table 40f as shown in FIG. 16.

Since there is no request of the maintenance condition later than the current time (step 204) in the request/condition storage table 40f, the service processor 10 calls the request composing means 13 (step 205). The request composing means 13 in turn executes its operation according to the flowchart of FIG. 3.

In this case, the necessity of the request/condition storage table 40f of FIG. 16 is "9" and there is a request of 8 or more corresponding to the range of the protective application task (step 301), the request composing means 13 calculates (sum of products of requests and necessities for all application requests)/(sum of necessities for all requests)=(0×9)/9=0 (step 302) with respect to the only request having the necessity of 8 or more, passes the calculated result to the request processing means 14 (step 304). The request processing means 14 adjusts its output in such a manner that the speed "0" is obtained.

As a result, the train A can stop on emergency and can avoid the collision with the train C.

The so far movements of the trains A and B are denoted by the reference numeral 60 showing the time and train position in FIG. 13, and the purposes of the 3 types of application tasks are all attained.

That is, the trains A and B arrive on a scheduled arrival times, reach the crossing nearly at the same time but from the opposite directions, and the train A avoid collision with the train C.

In accordance with the service processors of the present embodiment, since the additive conditions to the plurality of application tasks ("application tasks for running the trains according to the time schedule", "application tasks for avoiding collision with the ahead-running train", and "application tasks for reducing the wait time at railroad crossing") prepared independently on the basis of different request, for example, requests (degree), necessities and maintenance conditions can be properly distributed according to time, there can be provided such a service that reliably reflects the intentions of all the application tasks.

When the necessity of the "application task for avoiding collision with the ahead-running train" is set to be higher than those of the other application tasks, the intention of the protective application tasks can be reliably reflected preferentially to the other application tasks.

Although the service processors 10, 20 and 30 having the same structure have been used for the different trains A, B and C in the foregoing embodiment, when there are a plurality of service processor, it is unnecessary to make the same the request composing procedures in the respective service processors and different composing procedures may be executed. Further, one sort of service processors may be used, or the request composing procedure may be changed according to a change in the system environment.

The foregoing embodiment has been arranged so that a necessity range set for the protective application task, e.g., a very large range of necessity values has been provided for a specific task, e.g., the "application task for avoiding collision with the ahead-running train". However, for example, when the necessity is set in two rank (the first necessity and the second necessity) a first necessity may be used for the respective tasks and a second necessity may be used to make distinction between the protective and non-protective tasks. The second necessity may be expressed in terms of 2 values such as "1" for the protective tasks and otherwise "0", on the basis of which it may be judged whether or not the task is necessary. Or predetermined values of the second necessity may be set for the protective and non-protective tasks so that it is judged whether or not the task is necessary based on a comparison with a predetermined threshold value.

In accordance with the present invention, all the intentions of the application tasks independently prepared on the basis of the different request can be reliably reflected on the control objects. The intention of the protective application task can be reliably reflected preferentially to the other application tasks.

Explanation will then be made as to a second embodiment of the present invention.

Figure 17:
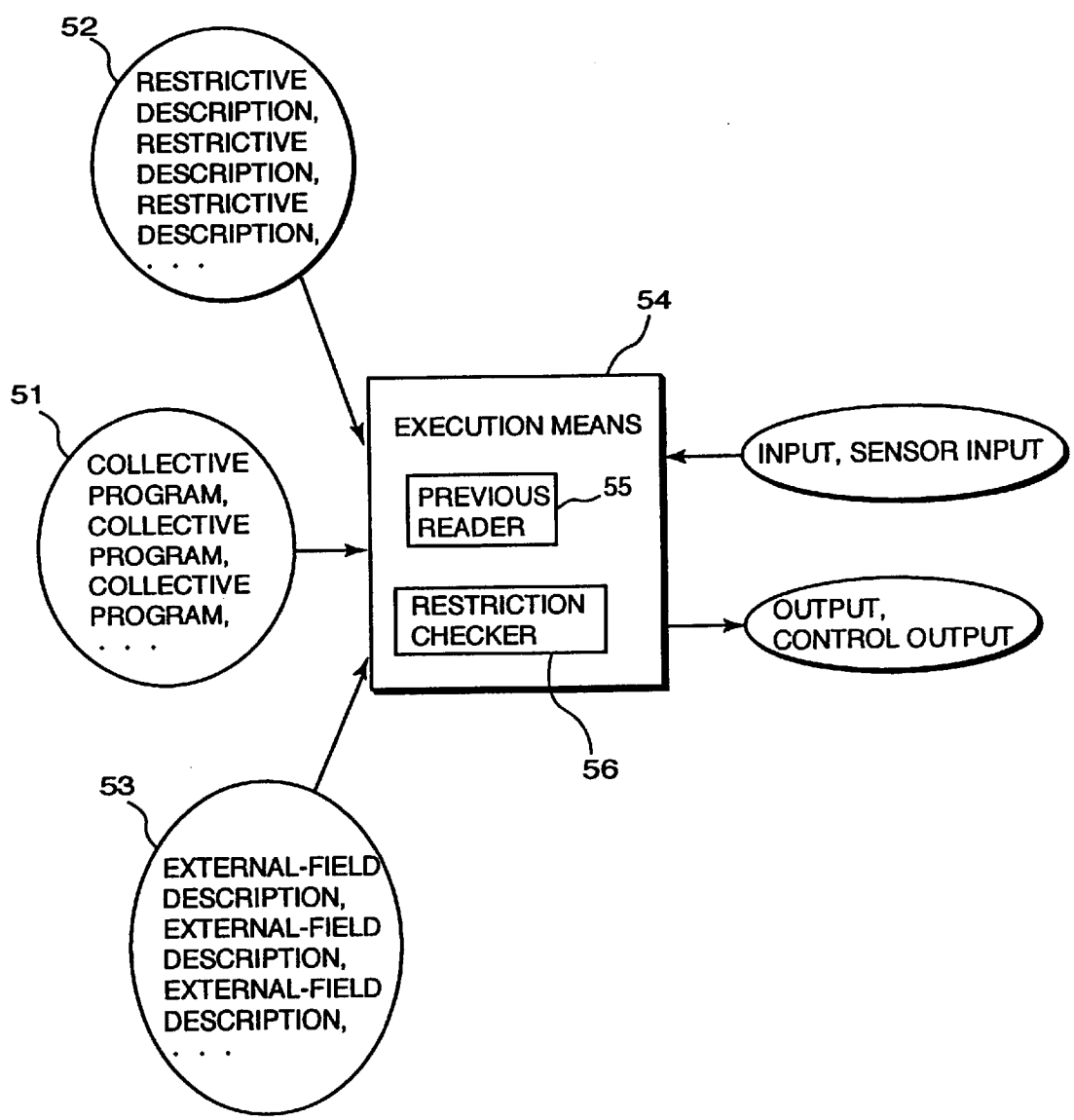
FIG. 17 is a block diagram of an arrangement of a program execution system for software development in accordance with the present invention.

Shown in FIG. 17 is a block diagram of an arrangement of a program execution system for software development of the present embodiment.

In FIG. 17, reference numeral 51 denotes a description language of collective programs including collections of a plurality of operations described in a parallel processing description format and in a selective parallel processing description format. Reference numeral 52 denotes a description language of restrictive conditions when programs are executed, numeral 53 denotes a description language (outside language) of a program for applying an external input or signal from a sensor, keyboard or mouse to a program being run, numeral 54 denotes an execution means for inputting the above description language programs and executing them. The execution means 54, during the execution of the program, determines an operation to be next executed from the collected operations of the programs and executes it in such a manner as to satisfy the restrictive conditions. In order to judge whether or not the state of the program after the execution of the operation satisfies the restrictive conditions, the execution means 54 generates a next state at a previous reader 55 and a restriction checker 56 judges whether or not the next state satisfies the restrictive conditions.

In the present embodiment, the program is treated as a state transition diagram. The state transition diagram has external and internal variables. The external variables, whose values can take only natural numbers having their upper limits, are disclosed for all the programs (global variables).

In this connection, the internal variables have no restrictions. The state transition diagram is made up of, for example, nodes to be transited as transition destinations, nodes as transition originators, and arrowed segments (which are known as "transition segments") connected between these nodes. The unit of the transition is called "edge". The edge comprises transition segments connected between a plurality of nodes or comprises a transition segment connected only to one side of a node, as will be explained later.

There are two methods of sorting the edges of the state transition diagram. That is, in one method, edges are classified into one edges having a single start point and a single end point and into the other edges having a single start point and a plurality of end points (which are also called selectable edges). The latter edges having a plurality of edges express their selectability.

In the other method, edges are classified into one edges having a blacked start point (fast edges) and into the other edges not having the blacked start point. The fast edge indicates that the transition should be done as soon as possible. Therefore, there are 4 types of description formats of expressing edges in a state transition diagram.

Described for an edge are, when a node as its start point is active, a character string (which is also called "condition part") indicative of an input or condition for transition to its end point and another character string (which is also called "processing part") indicative of the processing to be done when the input or condition takes place.

Described in the condition part are a condition judgement (which judgement statement judges only a constant and cannot contain a variable but can contain a logical operator) for inputs and external variables and condition judgement function calling (which body is described in a C language function having a computed result of 0 and 1).

Also described in the processing part are processing function calling (which body is described in a C language function), a change of the value of an external variable (which substitution expression can contain only a constant and substitution statement cannot contain a variable), and an output to another program (the value of an external variable must not be changed in the function).

Numeral values of 0 and 1 are distributed in the condition part (which is called branch probability). For edges having the same node as their start point, an addition of branch probabilities of condition parts having the same condition judgement of inputs and external variables must be 1.

In the case of the selectable edge, the condition part is described before a branch and the processing part is described after the branch.

When there are a plurality of edges having the same node as their start point, these condition parts must not be satisfied at the same time.

After the processing part is executed, the node as its start point becomes not active and instead a node of the edge as its end point becomes active. At this time, the input written in the processing part is consumed. The edge having no start point indicates a node (which is called "start node") which becomes active at the start time.

The selectability is expressed as a state in which edges having the same node as their start point and having the same input were branched. This means that "any of the edges may be selected". The parallelism is expressed by describing a plurality of state transition diagrams.

Inputs to be described in the condition parts of the state transition diagrams are divided into 2 types, i.e., inputs from a keyboard, sensor or mouse of the system to be executed (other than the execution environment) and inputs from the other state transition diagram being executed at the same time. However, these inputs are not distinguished clearly by representation. Further, the condition part may be blank (not be described). In this case, the condition part indicates to be satisfied in any case. Furthermore, the processing part may also be blank.

The restrictive conditions are expressed in terms of a logical expression. There are many ways of logical expressions. In primitive one of the expression ways, for example, a program name (state transition diagram name) and a node name therein form a set, which indicates such a restrictive condition that the active node in the state transition diagram of the program indicated by the program name is the node expressed by the node name.

The external-field description language is described by adding the restrictive condition to the state transition diagram of the program. The selectable edges used herein means that not "both of the edges can be selected" but "either one of the edges can be selected or take place". For edges other than the fast edges, their processing parts must not be described with outputs to the programs. Further, an external input at the time of the execution must correspond uniquely to an output described in the external-field description language.

In the external-field description, firstly, a processing function for a condition judgement function must not be described. Secondly, only the condition judgement of an external variable or only an input (program processing function name) from the program can be described in the condition part of the edge. Thirdly, the branch probability is distributed to the processing part. An addition of branch probabilities of the processing parts on the same edge must be smaller than 1.

Even in any of the program state transition diagram and external-field description language, at the time of the execution, the edges other than the fast edges are interpreted as edges added with edges having end points as their own and having blank processing parts. That is, edges which are not the selectable edges are changed to selectable edges. In this connection, when such an edge is selected (when selection is made in the external-field description language), the input is not consumed. Further, at the time of the execution, a given node is added with edges having the first-mentioned node as their start and end points. The condition part of the edge means that the condition parts of the edges having the node as their start points are not satisfied, and the processing part thereof is made blank.

In the external-field description, the branch probability of the added edge is interpreted as a subtraction of the branch probability of the other edge from 1.

The program processing function name is defined as used as an input of the external-field description.

The above execution means 54 inputs a plurality of programs and a plurality of external-field description languages and restriction expressions, selects and executes suitable operation. To this end, the execution means 54 has not only a function of processing inputs from keyboards, sensors and mouses of the system in the external-field other than the execution environment but also a function of extracting outputs to the associated external descriptions from the external field other than the execution environment. Further, The execution means 54 has a natural number constant N indicative of previous read number.

Explanation will next be made as to an algorithm for executing the programs of the execution means 54.

Figure 18A:
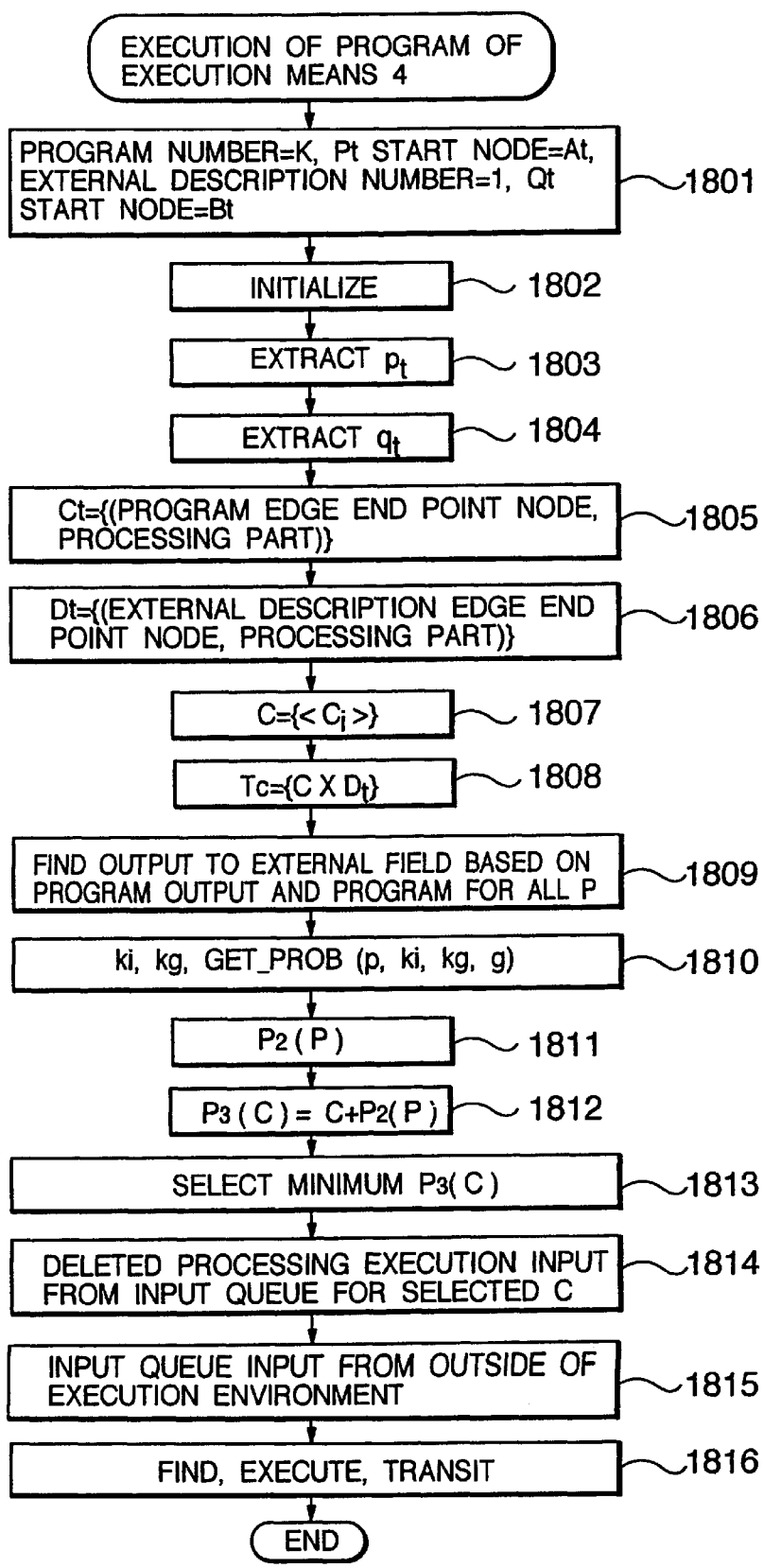
FIG. 18A is a flowchart showing an algorithm of the execution means.

FIG. 18A shows a flowchart of the algorithm. In this case, the restriction check is carried out previously by developing or converting all symbols in the restriction description and re-converting them into a sum-of-product standard form.

The number of programs to be executed is denoted by k. A start node of each program $P_t(0<t<k+1)$ is denoted by $A_t$. It is assumed that the number of external descriptions is 1 and a start node of each external description Qt ($0<t<l+1$) is denoted by $B_t$ (step 1801).

* Initialization

Blanks input and output queues. Also blanks and nullifies a virtual output queue and a group of virtual external values. It is assumed that a=N (step 1802).

* Execution

For execution, the following steps will be repeated.

1. For each Pt ($0<t<k+1$), edges Pt having current active nodes as their start points and having true condition parts are extracted from the input queue and variable values (step 1803).

2. For each $Q_t$ (0<t<l+1), edges $Q_t$ having current active nodes as their start points and having true condition parts are extracted from the input queue and variable values (step 1804).

3. A set of pairs of nodes used as end points of edges of each program and the processing parts of nodes reaching the first-mentioned nodes is denoted by $C_t$ (step 1805).

4. A set of pairs of nodes used as end points of edges of each external-field description and the processing parts (including branch probabilities) of nodes reaching the first-mentioned nodes is denoted by $D_t$ (step 1806).

5. C denotes a direct product of $C_i$ (step 1807). In this case, the source of C means a set of active nodes of each program after transition and operations for the transition to the nodes.

6. For each source c of C, $T_c$ is a direct product of c and $D_t$ (step 1808). In this case, each source of $T_c$ means a set of active nodes of the program and external description and operations for the transition to the nodes.

7. For a p (p belonging to $T_c$), there are obtained through the operation the value of the external variable for p, an output from the external-field description, an output from one program to another program, and an output from the program to the external field (step 1809).

8. For a p (p belonging to $T_c$), a virtual input queue ki and a virtual external variable value group kg are created from the above obtained outputs, g=N and P=p are set, to thereby extract a problem occurrence probability from "an algorithm for acquiring the problem occurrence probability" of "get_prob (P, ki, kg, g)" to be explained later, which probability is denoted by p1(p) (step 1810).

9. A multiplication of a multiplication of all branch probabilities distributed to the processing part reaching each $Q_t$ (0<t<l+1) node of p and p1(p) is denoted by p2(p) (step 1811).

10. For a c (c belonging to C), an addition of p2(p) to all p (p belonging to $T_c$) is denoted by p3(c) (step 1812). The p3(c) means a problem occurrence probability when the operation to c is selected.

11. For all c (c belonging to C), p3(c) is found and smallest one of these p3(c) is selected (step 1813). When there are a plurality of the smallest p3(c), one p3(c) having the most plentiful steps is selected. When there are many of them, any of them may be selected.

12. For the selected c (c belonging to C), the processing for reaching each node of c is extracted and executed. The input used at the time of the execution is deleted from the input queue (step 1814).

13. An input from the external field other than execution environment is examined and put it in the input queue (step 1815).

14. In the external description, one of the inputs in the input queue coinciding with the currently executable processing part is found, the processing part is executed and transited (step 1816).

The program executing operation has been completed.

Explanation will next be made as to the algorithm for acquiring the problem occurrence probability.

Figure 18B:
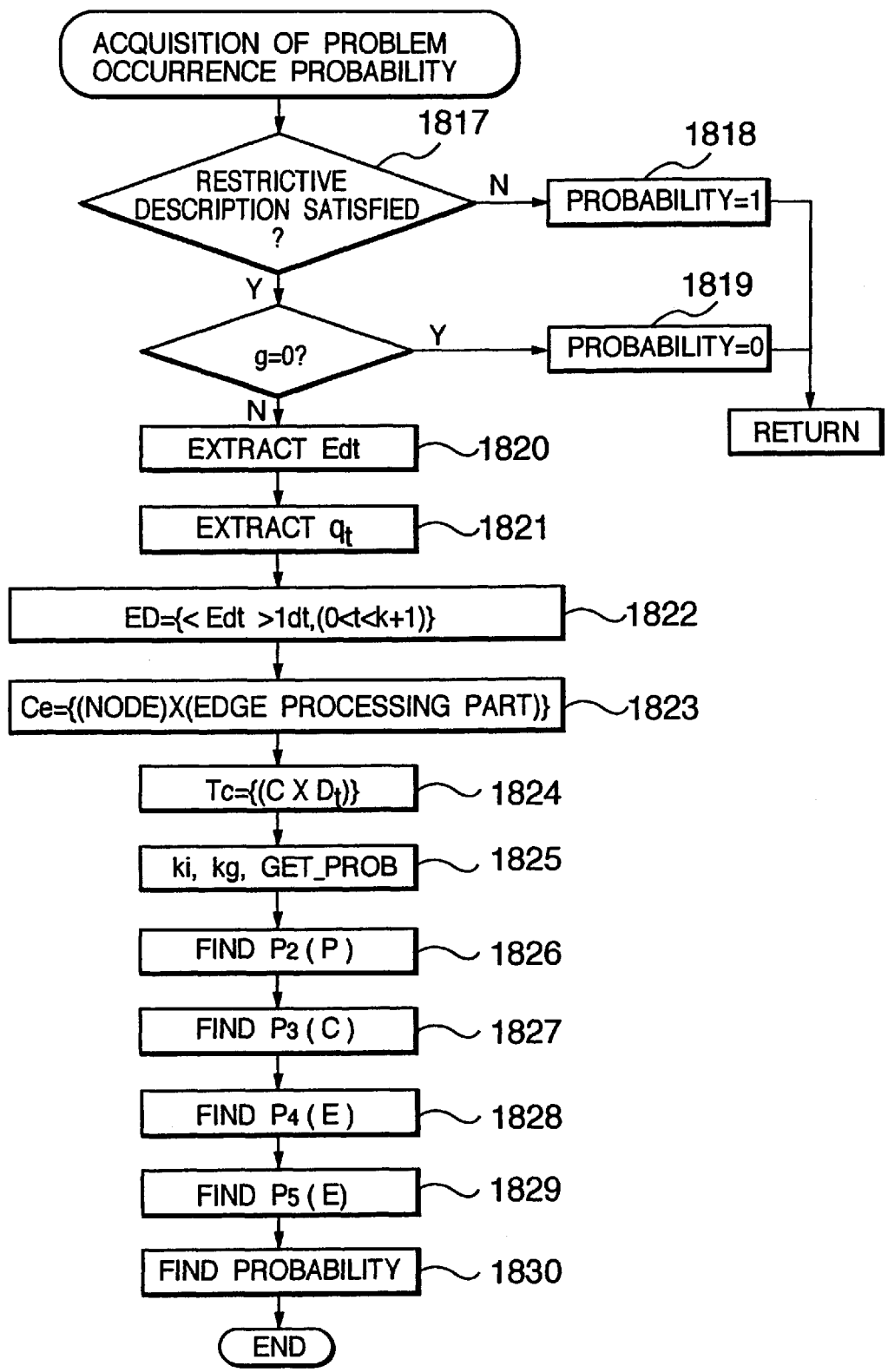
FIG. 18B is a flowchart showing an algorithm for acquiring a problem occurrence probability.

FIG. 18B is a flowchart of the algorithm.

1. P checks that the restrictive description is satisfied (step 1817). When the restrictive description is not satisfied, the probability is set at 1 and the system goes to a return step (step 1818).

2. When g=0, the probability is set at 0 and the system goes to the return step (step 1819).

3. For each node $P_t$ of P, a set $Ed_t=\{P_{t1}, P_{t2}, \ldots Ptn_t\}$ of a set of edges which have currently active nodes as their start points and which condition parts are true are extracted from the input queue and the values of variables (step 1820). However, the function part is not evaluated and the condition parts which true or false is affected by the value of the function part are considered to be true.

4. For nodes $Q_t$ of each external-field description of P, edges $q_t$ which have currently active nodes as their start points and which condition parts are true are extracted from the input queue and the values of variables (step 1821).

5. A direct product for Each $Ed_t$ (0<t<k+1) is denoted by CD (step 1822).

6. For e (e belonging to ED), a direct product of a set of pairs of nodes as end points of edges of e and processing parts of edges reaching the nodes is denoted by Ce (step 1823). The source of $C_e$ indicates a set of active nodes of each program after transition shown by e and the operations when the nodes are transited to the active nodes.

7. For each source c of $C_e$, a direct product c and Dt is denoted by $T_c$ (step 1824). Each source of $T_c$ indicates a set of active nodes of the external description and operations for transition to the active nodes.

8. For a p (p belonging to $T_c$), the value of the external variable of p, an external input, an output from one program to another program, and an output from the program to the external field can be calculated through the operations. The calculated result is put in the virtual input queue ki and virtual external variable value group kg, g=g−1 and P=p are set, and the problem occurrence probability is extracted through a recursive call "algorithm for acquiring the problem occurrence probability" of "get_prob (P,ki,kg,g)". This probability is denoted by pl(p) (step 1825).

9. A multiplication of a multiplication of all branch probabilities distributed to the processing parts reaching the nodes of each $Q_t$ (0<t<l+1) of p by p1(p) is denoted by p2(p) (step 1826).

10. For a c (c belonging to $C_e$), an addition of p2(p) to all p (p belonging to $T_c$) is denoted by p3(c) (step 1827). The p3(c) indicates a problem occurrence probability when the operation to c is selected.

11. For all c (c belonging to $C_e$), smallest one of p3(c) is denoted by p4(e) (step 1828).

12. For each e (e belonging to ED), a multiplication of a multiplication of branch probabilities distributed to the condition parts of edges forming e by p4(e) is denoted by p5(e) (step 1829).

13. An addition of p5(e) to all e (e belonging to ED) indicates a found probability (step 1830). All the operations have been completed.

For the omitted branch probability, the branches are considered to occur with the same probability. For example, when there are 2 branches and no branch probability is described for them, the branch probabilities for the branches are considered to be 0.5 and 0.5.

External inputs which are not described in the external description are considered to always both take place (with the same probability) in the start point node of edges whose condition parts have the external inputs described therein.

The operation of the present embodiment will next be explained.

Figure 19:
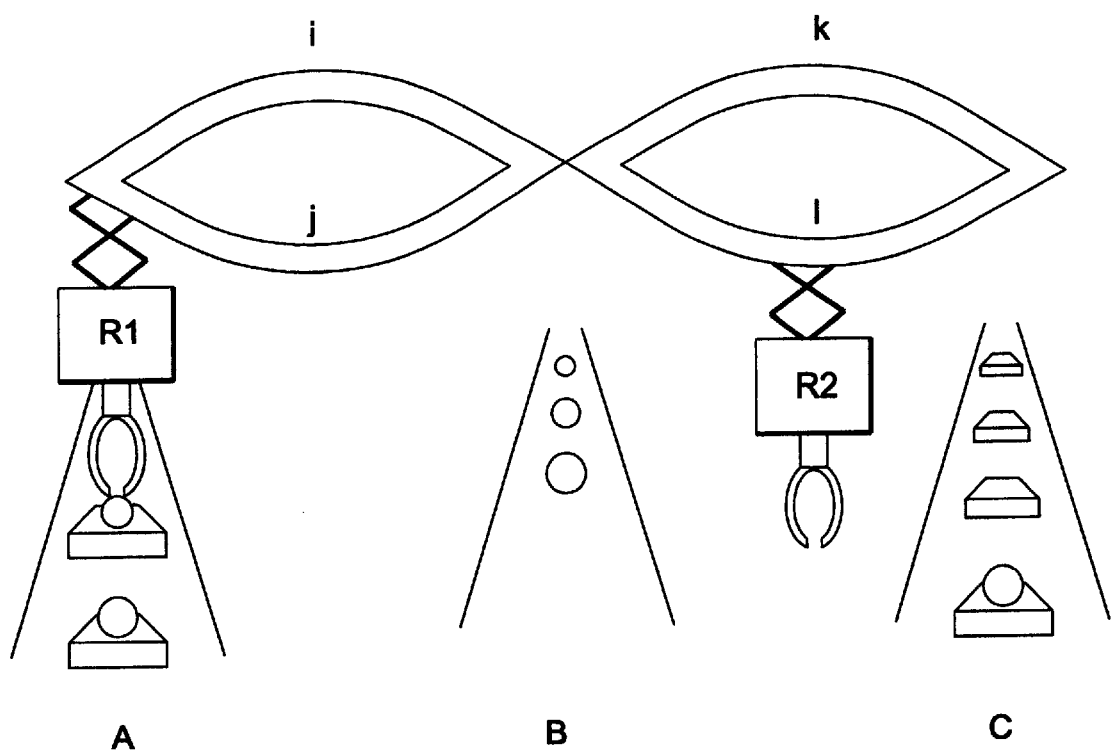
FIG. 19 shows an example of control system developed by the program execution system of FIG. 17.

Now explanation will be made in connection with a software example in which, as shown in FIG. 19, there are 3 lines A, B and C, above which 2 robots R1 and R2 for moving along 6 rails to transport parts are provided for control.

Figure 20:
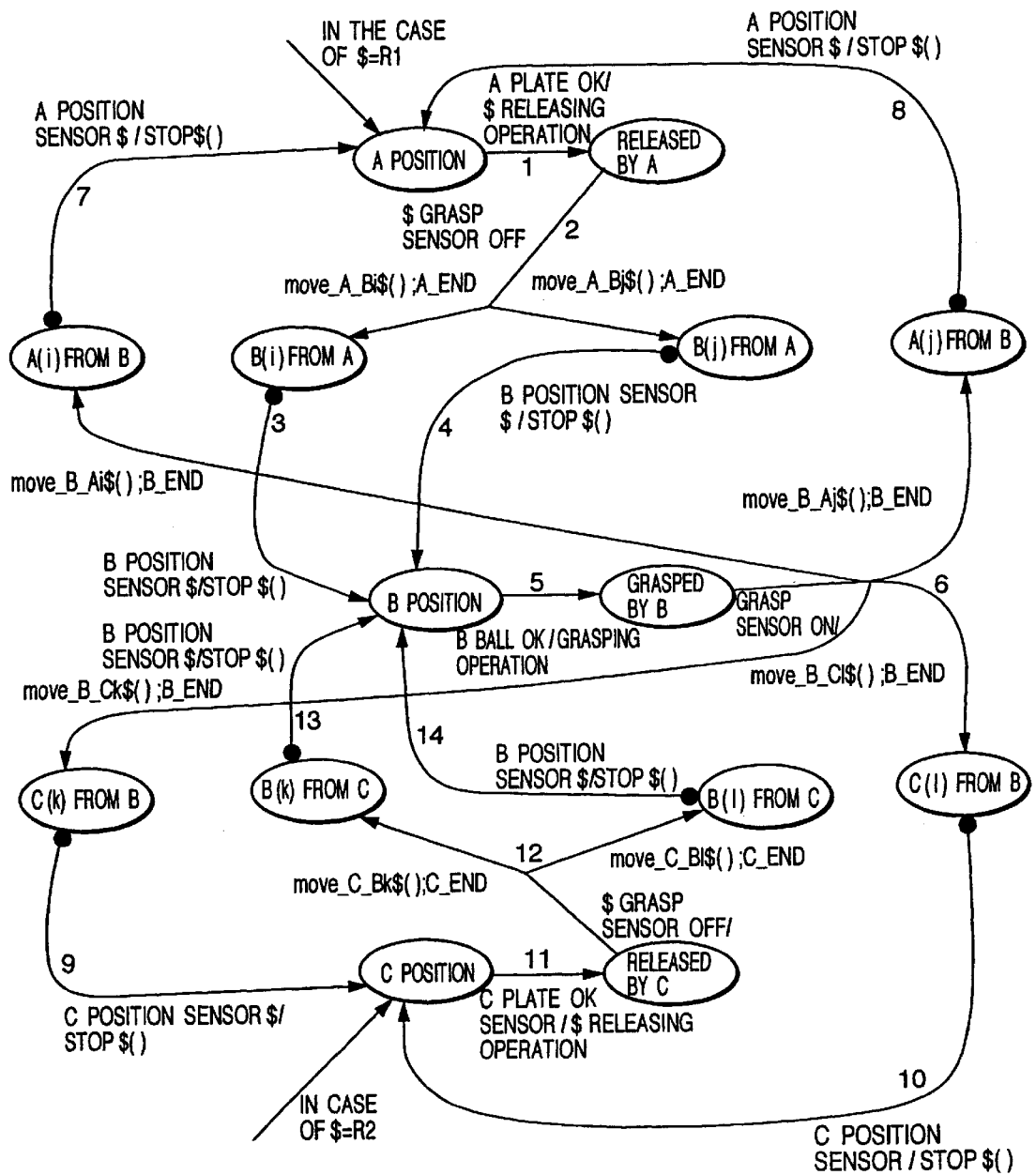
FIG. 20 is a state transition diagram representing a robot operating program in the control system of FIG. 19.
Figure 21A:
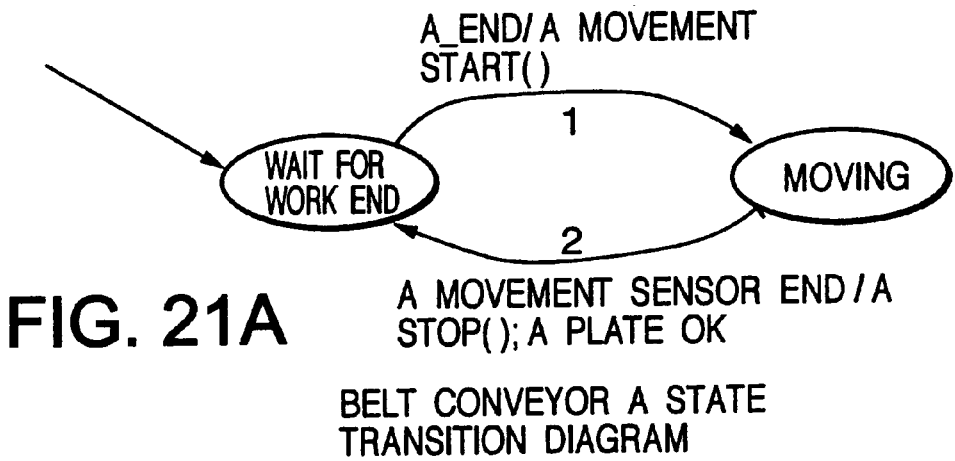
FIG. 21 is a state transition diagram representing operating programs of belt conveyors in the control system of FIG. 19.
Figure 21B:
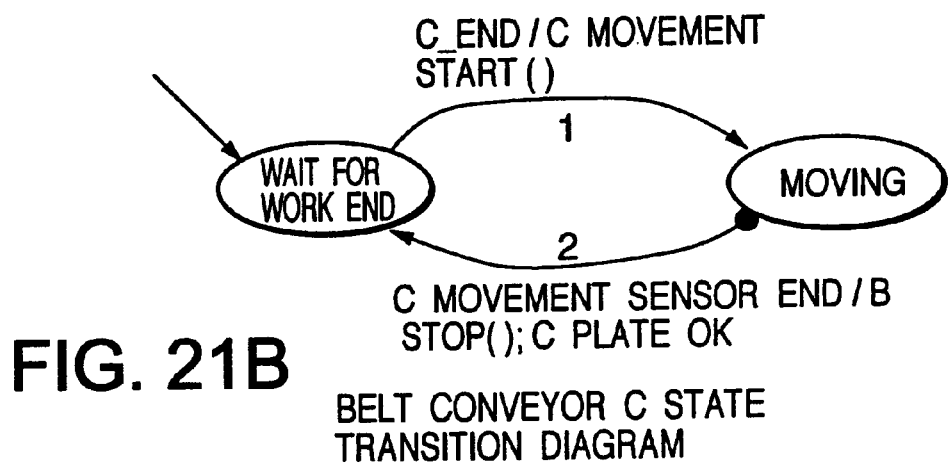
Figure 21C:
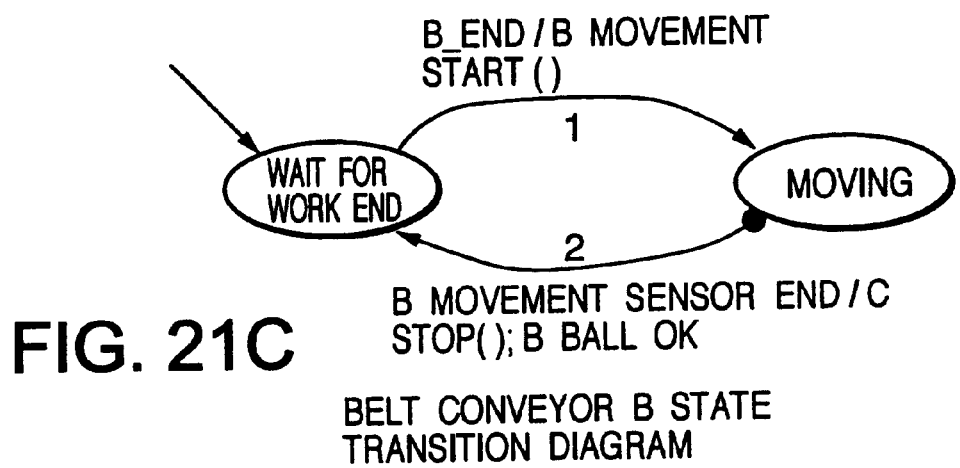

FIGS. 20 and 21 are state transition diagrams for representing the program. In FIG. 20, symbol $ is replaced by robot names (R1, R2).

Figure 22A:
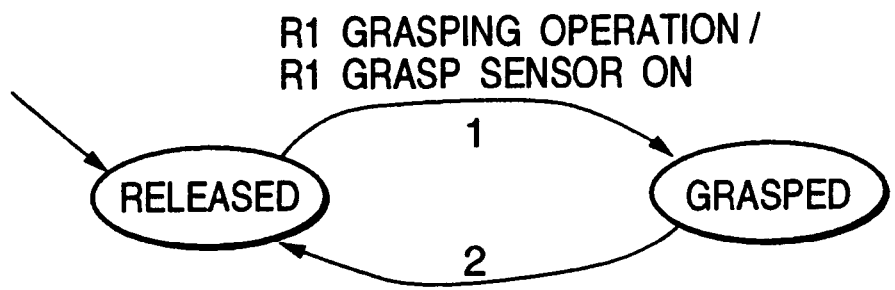
FIG. 22 shows examples of external-field description relating to the operations of arms in the control system of FIG. 19.
Figure 22B:
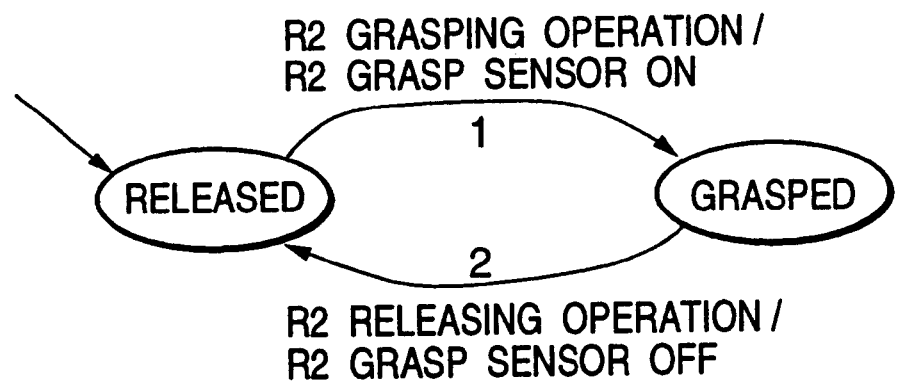
Figure 23:
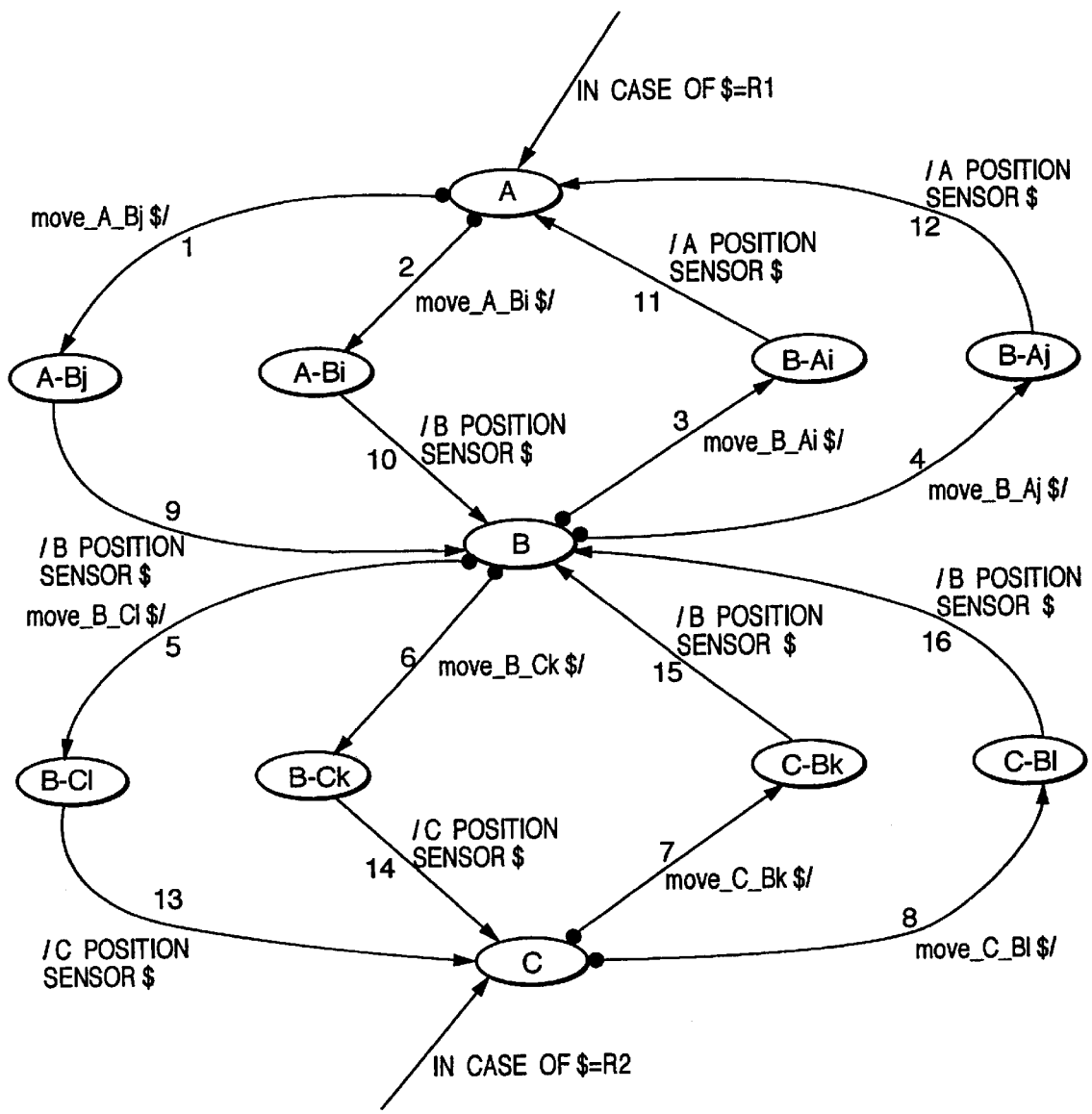
FIG. 23 shows an example of external-field description relating to robot positions in the control system of FIG. 19.
Figure 24A:
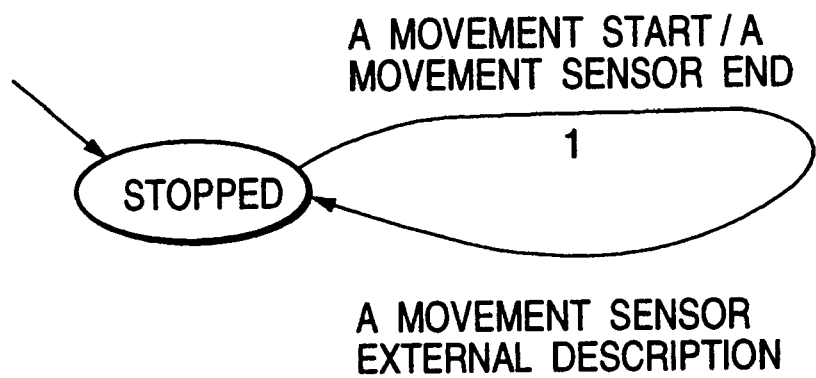
FIG. 24 shows examples of external-field description relating to movement sensors in the control system of FIG. 19.
Figure 24B:
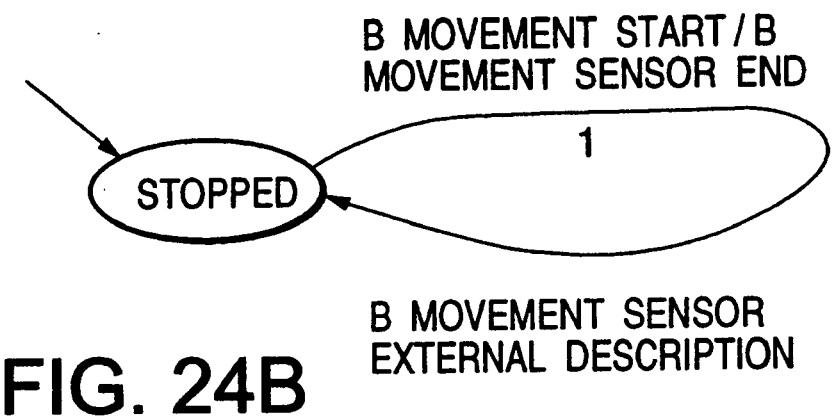
Figure 24C:
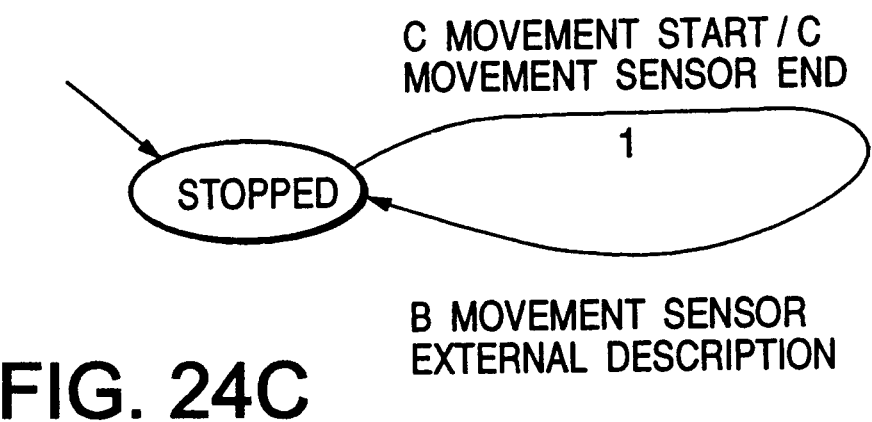

FIGS. 22, 23 and 24 are examples of the external-field description, in which symbol $ is replaced by robot names (R1, R2). When the followings are assumed;

$P_1$=program for robot R1
$P_2$=program for robot R2
$P_3$=program for belt conveyer A
$P_4$=program for belt conveyer B
$P_5$=program for belt conveyer C
$Q_1$=R1 arm external description
$Q_2$=R2 arm external description
$Q_3$=R1 position external description
$Q_4$=R2 position external description
$Q_5$=A movement sensor external description
$Q_6$=B movement sensor external description
$Q_7$=C movement sensor external description the restrictive description becomes as follow.

$$\forall a \in NodeR1.(\cdot(Q_3(a) \wedge Q_4(a)))$$

and $$\forall (a,b) \in NodeR2.(\cdot(P_1(a) \wedge P_2(b)))$$

where, it is assumed that:
NodeR1={A,B,C}
and
NodeR2={(A(i) from B, B(i) from A) , (B(i) from A, A(i) from B,), (A(j) from B, B(j) from A), (B(j) from A, A(j) from B), (C(k) from B, B(k) from C), (B(k) from C, C(k) from B), (C(l) from B, B(l) from C), (B(l) from C, C(l) from B)}

There is no external variable and the previous read value N is set to be 3.

It is also assumed as an example of execution system that: the active nodes, P1 indicate "released by A", $P_2$ indicates "grasped by B", $P_3$ indicates "waiting for work completion", $P_4$ indicates "waiting for work completion", $P_5$ indicates "moving", $Q_1$ indicates "released", $Q_2$ indicates "grasped", $Q_3$ indicates "A", $Q_4$ indicates "B", $Q_5$ indicates "stopped", $Q_6$ indicates "stopped", and $Q_7$ indicates "stopped"; and
the input queue includes R1 grasp sensor OFF, R2 grasp sensor ON and C movement sensor END.

Here is how "next operation" is selected at this time.

1. For each Pt (0<t<6), edges whose condition parts are true are extracted.

$P_1$=2, $P_2$=6, $P_3$=, $P_4$=0, $P_5$=2

2. For each $Q_t$ (0<t<8), edges whose condition parts are true are extracted.

$Q_1$=0, $Q_2$=0, $Q_3$=0, $Q_4$=0, $Q_5$=0, $Q_6$=0, $Q_7$=0,

3. Next, $C_t$ (0<t<6) are found.
$C_1$={(released by A, {}), (Bi from A, move _A_Bi();A _END), (Bj from A, move _A _Bj(); A _END)}
$C_2$={(grasped by B, {}), (Ai from B, move _B _Ai();B _END), (Aj from B, move _B _Aj(); B _END), (C1 from B, move _B _C1(); B _END), (Ck from B, move _B _Ck(); B _END)}
$C_3$={ (wait for work, {})}
$C_4$={(wait for work, {})}
$C_5$={(wait for work, stopped (); C plate OK)}

4. Next $D_t$ (0<t<8) are found.
$D_1$={($Q_1$ (released), {})},
$D_2$={($Q_2$ (grasped), {})},
$D_3$={($Q_3$ (A), {})},
$D_4$={($Q_4$ (B), {})},
$D_5$={($Q_5$ (stopped), {})},
$D_6$={($Q_6$ (stopped), {})},
$D_7$={($Q_7$ (stopped), {})}, 5. C={<$c_1$, $c_2$, ... ,$c_5|_1 c_i$ ($c_i$ belonging to $C_i$), 0<i<6}
6. For c (c belonging to C), $T_c$={<c, d1, ... ,d7>|(di belonging to Di), 0<i<8} C consists of 8 sources.
7. For all p (p belonging to $T_c$), the output to the program and the output from the program to the external field are obtained by the respective processing parts. For example, the followings are set:
c=<($Q_1$ (released), {}), ($Q_2$ (grasped), {}), ($Q_3$ (A), {}), ($Q_4$ (A), {}), ($Q_5$ (stopped), {}),($Q_6$ (stopped), {}), ($Q_7$ (stopped), {})>
p=<($P_1$ (Bi from A), move _A _Bi() ;A_END), ($P_2$ (Ai from B), move _B _Ai() ;B_END), ($P_3$ (wait for work), {}), ($P_4$ (wait for work), {}), ($P_5$ (wait for work), stopped ();C plate OK), ($Q_1$ (released), {}), ($Q_2$ (grasped), {}) ($Q_3$ (A), {}), ($Q_4$ (B), {}), ($Q_5$ (stopped), {}), ($Q_6$ (stopped), {}), ($Q_7$ (stopped), {})>
the inputs for the virtual input queue ki, virtual output queue ko and virtual external variable value group kg are:
* Consumed: R1 grasp sensor OFF, R1 grasp sensor ON, and C movement sensor END
*Added: move _A Bi, A _END, move _B_Ai END, stopped, C plate OK
Thus, the virtual input queue ki becomes: move _A_Bi, A _END, move _B _Ai, B _END, stopped, C plate OK 8. For all p (p belonging to $T_c$), the problem occurrence probability is extracted from "algorithm for acquiring the problem occurrence probability" of "get _prob (P, ki, g)". For example, in the case of the above p,
p=<(Bi from A), move _A _Bi() ; A_END), (Ai from B), move _B_Ai() ;B_END), (wait for work, {}), (wait for work, {}), (wait for work, stopped ()), (C plate OK, ), ($Q_1$ (released), {}), ($Q_2$ (grasped), {}), ($Q_3$ (A), {}), ($Q_4$ (B), {}), ($Q_5$ (stopped), {}), ($Q_6$ (stopped), {}), ($Q_7$ (stopped), {})>
The virtual input queue ki calculates "get _prob (P, ki, g)" for "move _A _Bi, A _END, move _B _Ai, B _END, stopped, C plate OK and g=3". Since the restrictive description is not satisfied in P, "get _prob (P, ki, g)"=1.

9. A multiplication of all branch probabilities distributed to the processing parts reaching each $Q_t$ (0<t<8) node of p by p1(p) is assumed to be denoted p2(p). In the above example, p2(p)=1.

10. For a c (c belonging to C), an addition of p2(p) for all p (p belonging to $T_c$) is assumed to be denoted by p3(c). In the above example, for instance, p3(p)=1.

11. For all c (c belonging to C), p3(c) are found and smallest one of p3(c) is selected. The smallest p3(c) include the following:
(a)<(released by A, {}), (grasped by B, {}), (wait for work, {}), (wait for work, {}), (wait for work, stopped (); C plate OK)>

(b) <(released by A, {}), (Ai from B, move _B _Ai() ;B _END), (wait for work, stopped (); C plate OK)>

(c) <(released by A,(Aj from B, move _B _Aj() ;B _END), (wait for work, {}), (wait for work, {}), (wait for work, stopped (); C plate OK)>

(d)<(released by A,{}), (C1 from B, move _B _C1() ;B-END), (wait for work, {}), (wait for work, {}), (wait for work, stopped (); C plate OK)>

(e) <(released by A,{}), (Ck from B, move _B _Ck() ;B-END), (wait for work, {}), (wait for work, {}), (wait for work, stopped (); C plate OK)>

(f) <(Bi from A, move _A _Bi() ;A _END), (grasped by B, {}), (wait for work, {}), (wait for work, {}), (wait for work, stopped (); C plate OK)>

(g) <(Bi from A, move _A _Bi() ;A _END), (Aj from B, move _B_Aj(); B _END), (wait for work, {}), (wait for work, {}) (wait for work, stopped (); C plate OK)>

(h) <(Bi from A, move _A _Bi() ;A _END), (C1 from B, move _B_C1(); B _END), (wait for work, {}), (wait for work, {}), (wait for work, stopped (); C plate OK)>

(i) <(Bi from A, move _A _Bi() ;A _END), (Ck from B, move _B_Ck(); B _END), (wait for work, {}), (wait for work, {}), (wait for work, stopped (); C plate OK)>

Among the above smallest p3(c), the most operations are:

(a) <(Bi from A, move _A _Bi();A _END), (Aj from B, move _B_Aj();B _END), (wait for work, {}), (wait for work, {}), (wait for work, stopped (); C plate OK)>

(b) <(Bi from A, move _A Bi();A _END), (C1 from B, move _B_C1();B _END), (wait for work, {}), (wait for work, {}), (wait for work, stopped (); C plate OK)>

(c) <(Bi from A, move _A _Bi();A _END), (Ck from B, move _B-Ck();B _END), (wait for work, {}), (wait for work, {}), (wait for work, stopped (); C plate OK)>

Now, since C is already ready in this problem, the following is considered not to be optimum.

(a) <(Bi from A, move _A Bi();A _END), (Aj from B, move _B_Aj();B _END), (wait for work, {}), (wait for work, {}),(wait for work, stopped (); C plate OK)>

However, since the programs of the robots R1 and R2 do not check whether or not A and C get ready, this is no problem in this system. Assume now that the following (a) was selected.

(a) <(Bi from A, move _A Bi();A END), (Cj from B, move _B_Ck();B _END), (wait for work, {}), (wait for work, {}), (wait for work, stopped (); C plate OK>

12. The operation to be performed and output are: Ck from B, move B_Ck();B_END, C plate OK Thus, the active points of the changed program are:

P1 (Bi from A), P2 (Aj from B), P5 (wait for work)

13. An input from the non-execution environment is examined and placed in the input queue.

14. In the external description, one of inputs in the input queue coinciding with the currently-executable processing part is found, the processing part is executed for its transition.

The present invention is not restricted to the aforementioned embodiments. For example, although restriction check has been carried out after generation of the next state based on the previous reading in the present embodiment, when the restriction check is carried out simultaneously with the previous reading, costs necessary for the selection of the next operation can be lowered. Further, when logic is such a modal logic as a time logic in the restrictive description, such restriction as time series can be described.

As has been explained in the foregoing, in accordance with the present invention, since the object and restriction in the description of a program can be separately described, an error possibility when they are combined can be made zero. Further, even when the executing environment (programs to be operated at the same time, dependency relation of objects to be controlled, etc.) is changed, this can be coped with by rewriting the restrictive conditions, thus enhancing the diverse usability of programs.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A system for executing a plurality of programs for controlling an object, comprising:
    a transmitting part configured to transmit state of said object to said programs;
    an execution part configured to independently execute each of said programs to which said state of the object is transmitted;
    an accepting part configured to accept an executed result and a condition from each of said programs;
    a memory part configured to memorize a plurality of said executed results and a plurality of said conditions;
    a composing part configured to compose a plurality of said executed results on the basis of a plurality of said conditions; and
    a transmitting part configured to transmit a composed result by said composing part to said object,
    wherein said accepting part configured to accept another condition from each of said programs, said condition is necessity to each of said programs and said another condition is a maintaining condition for maintaining each of said programs, and said composing part composes a plurality of said executed results of said programs satisfying a plurality of said maintaining conditions on the basis of a plurality of said necessities.

2. The system as set forth in claim 1, wherein said composing part configured to compose executed results of said programs according to:
    (sum of products of a plurality of said executed results multiplied by said necessities)/ (sum of said necessities).

3. The system as set forth in claim 1, wherein said maintaining condition is maintaining times.

4. The system as set forth in claim 1, wherein said maintaining condition is the number of maintaining frequencies.

5. A system for executing a plurality of programs for controlling an object, comprising:
    a transmitting part configured to transmit state of said object to said programs;
    an execution part configured to independently execute each of said programs to which said state of the object is transmitted;
    an accepting part configured to accept an executed result and a condition from each of said programs;
    a memory part configured to memorize a plurality of said executed results and a plurality of said conditions;
    a composing part configured to compose a plurality of said executed results on the basis of a plurality of said conditions; and a transmitting part configured to transmit a composed result by said composing part to said object, wherein said condition is necessity to each of said programs, and said composing part composes a plurality of said executed results of said programs having said necessity exceeding a predetermined threshold value.

6. The system as set forth in claim 5, wherein said composing part configured to compose executed results of said programs according to:

(sum of products of a plurality of said executed results multiplied by said necessities)/ (sum of said necessities).

7. A system for executing a plurality of programs for controlling an object, comprising:

a transmitting part configured to transmit state of said object to said programs;

an execution part configured to independently execute each of said programs to which said state of the object is transmitted;

an accepting part configured to accept an executed result and a condition from each of said programs;

a memory part configured to memorize a plurality of said executed results and a plurality of said conditions;

a composing part configured to compose a plurality of said executed results on the basis of a plurality of said conditions; and a transmitting part configured to transmit a composed result by said composing part to said object, wherein said accepting part configured to accept another condition from each of said programs, said conditions is a first necessity of each of said programs and said another condition is a second necessity of each of said programs, and said composing part composes a plurality of said executed results of said programs having said second necessity on the basis of said first necessity.

8. The system as set forth in claim 7, wherein said composing part configured to compose executed results of said programs having said second necessity according to:

(sum of products of a plurality of said executed results multiplied by said first necessities)/(sum of said first necessities).

9. A system for executing a plurality of programs including a group of operations for controlling objects, said programs outputting operations from said group of operations as execution results, comprising:

external-field description part configured to describe predetermined transition relation between transition origin states and transition destinations states to be transited from the transition origin states as a result of said operations;

a beforehand reading part configured to beforehand read execution results of outputted operations of said programs according to said predetermined transition relation;

a selection part configured to select one or more of said outputted operations to be next executed on the basis of said beforehand read execution results and predetermined restriction conditions;

an execution part configured to independently execute each of said selected operations of said programs; and a transmitting part configured to transmit the execution results to said objects, wherein said selection part predicts possible states on the basis of current states of the programs, extracts one or ones of the states satisfying said restrictive conditions from said predicted states, and selects one or more of the operations in such a manner as to reach said states.

10. The system as set forth in claim 9, wherein at least one of said transition destinations states have branch probability information indicative of easiness in branch occurrence from said transition origin states, and said selection part selects one or more of said operations also taking said branch probability information into consideration.

11. The system as set forth in claim 9, wherein said selection part sequentially selects one of a plurality of said operations having a maximum number of selection candidates when there are the plurality of operations to be executed.

12. A method for executing a plurality of programs for controlling an object, comprising the steps of:

transmitting state of said object to said programs;

independently executing each of said programs to which said state of the object is transmitted;

accepting an executed result and a condition from each of said programs;

composing a plurality of said executed results of said programs on the basis of a plurality of said conditions; and transmitting a composed result to said object, wherein, in said accepting step, accepting another condition from each of said programs, wherein said condition is necessity of each of said programs and said another condition is maintaining condition for maintaining each of said programs, and in said composing step, a plurality of said executed results of said programs satisfying a plurality of said maintaining conditions are composed on the basis of a plurality of said necessities.

13. A method for executing a plurality of programs for controlling an object, comprising the steps of:

transmitting state of said object to said programs;

independently executing each of said programs to which said state of the object is transmitted;

accepting an executed result and a condition from each of said programs;

composing a plurality of said executed results of said programs on the basis of a plurality of said conditions; and transmitting a composed result to said object, wherein, in said accepting step, accepting another condition from each of said programs, wherein said condition is a first necessity to each of said programs and said another condition is a second necessity to each of said programs, and in said composing step, a plurality of said executed results of said programs having said second necessity exceeding a predetermined threshold value are composed on the basis of said first necessity.

14. A method for executing a plurality of programs for controlling an object, comprising the steps of:

transmitting state of said object to said programs;

independently executing each of said programs to which said state of the object is transmitted;

accepting an executed result and a condition from each of said programs;

composing a plurality of said executed results of said programs on the basis of a plurality of said conditions; and transmitting a composed result to said object, wherein, in said accepting step, accepting another condition from each of said programs, wherein said condition is a first necessity to each of said programs and said another condition is a second necessity to each of said programs, and in said composing step, a plurality of said executed results of said programs having said second necessity are composed on the basis of said first necessity.

15. A medium for recording thereon a second program for executing a plurality of first programs for controlling an object, wherein said second program comprising:

a transmitting part configured to transmit state of said object to said first programs;

an execution part configured to independently execute each of said first programs to which said state of the object is transmitted;

an accepting part configured to accept an executed result and a condition from each of said first programs;

a memory part configured to memorize a plurality of said executed results and a plurality of said conditions;

a composing part configured to compose a plurality of said executed results on the basis of a plurality of said conditions; and a transmitting part configured to transmit a composed result by said composing part to said object, wherein said accepting part configured to accept another condition from each of said first programs, said condition is necessity to each of said programs and said another condition is maintaining condition for maintaining each of said first programs, and said composing part composes a plurality of said executed results of said first programs satisfying a plurality of said maintaining conditions on the basis of a plurality of said necessities.

16. A medium for recording thereon a second program for executing a plurality of first programs for controlling an object, wherein said second program comprising:

a transmitting part configured to transmit state of said object to said first programs;

an execution part configured to independently execute each of said first programs to which said state of the object is transmitted;

an accepting part configured to accept an executed result and a condition from each of said first programs;

a memory part configured to memorize a plurality of said executed results and a plurality of said conditions;

a composing part configured to compose a plurality of said executed results on the basis of a plurality of said conditions; and a transmitting part configured to transmit a composed result by said composing part to said object, wherein said condition is necessity to each of said first programs, and said composing part composes a plurality of said executed results of said first programs having said necessity exceeding a predetermined threshold value.

17. A medium for recording thereon a second program for executing a plurality of first programs for controlling an object, wherein said second program comprising:

a transmitting part configured to transmit state of said object to said first programs;

an execution part configured to independently execute each of said first programs to which said state of the object is transmitted;

an accepting part configured to accept an executed result and a condition from each of said first programs;

a memory part configured to memorize a plurality of said executed results and a plurality of said conditions;

a composing part configured to compose a plurality of said executed results on the basis of a plurality of said conditions; and a transmitting part configured to transmit a composed result by said composing part to said object, wherein said accepting part configured to accept another condition from each of said first programs, said conditions is a first necessity of each of said first programs and said another condition is a second necessity of each of said first programs, and said composing part composes a plurality of said executed results of said first programs having said second necessity on the basis of said first necessity.

18. A medium for recording thereon a second program for executing a plurality of first programs including a group of operations for controlling objects, said first programs outputting operations from said group of operations as execution results, wherein said second program comprising:

external-field description part configured to describe predetermined transition relation between transition origin states and transition destinations states to be transited from the transition origin states as a result of said operations;

a beforehand reading part configured to beforehand read execution results of outputted operations of said first programs according to said predetermined transition relation;

a selection part configured to select one or more of said outputted operations to be next executed on the basis of said beforehand read execution results and predetermined restriction conditions;

an execution part configured to independently execute each of said selected operations of said first programs; and a transmitting part configured to transmit the execution results to said objects, wherein said selection part predicts possible states on the basis of current states of the first programs, extracts one or ones of the states satisfying said restrictive conditions from said predicted states, and selects one or more of the operations in such a manner as to reach said states.

19. A medium for recording thereon a second program for executing a plurality of first programs for controlling an object, wherein said second program comprising the steps of:

transmitting state of said object to said first programs;

independently executing each of said first programs to which said state of the object is transmitted;

accepting an executed result and a condition from each of said first programs;

composing a plurality of said executed results of said first programs on the basis of a plurality of said conditions; and transmitting a composed result to said object, wherein, in said accepting step, accepting another condition from each of said first programs;

wherein said condition is necessity of each of said first programs and said another condition is maintaining condition for maintaining each of said first programs, and in said composing step, a plurality of said executed results of said first programs satisfying a plurality of said maintaining conditions are composed on the basis of a plurality of said necessities.

20. A medium for recording thereon a second program for executing a plurality of first programs for controlling an object, wherein said second program comprising the steps of:

transmitting state of said object to said first programs;

independently executing each of said first programs to which said state of the object is transmitted;

accepting an executed result and a condition from each of said first programs;

composing a plurality of said executed results of said first programs on the basis of a plurality of said conditions; and transmitting a composed result to said object, wherein, in said accepting step, accepting another condition form each of said first programs, wherein said condition is a first necessity to each of said first programs and said another condition is a second necessity to each of said first programs, and in said composing step, a plurality of said executed results of said first programs having said second necessity exceeding a predetermined threshold value are composed on the basis of said first necessity.

21. A medium for recording thereon a second program for executing a plurality of first programs for controlling an object, wherein said second program comprising the steps of:

transmitting state of said object to said first programs;

independently executing each of said first programs to which said state of the object is transmitted;

accepting an executed result and a condition from each of said first programs;

composing a plurality of said executed results of said first programs on the basis of a plurality of said conditions; and transmitting a composed result to said object, wherein, in said accepting step, accepting another condition from each of said first programs, wherein said condition is a first necessity to each of said first programs and said another condition is a second necessity to each of said first programs, and in said composing step, a plurality of said executed results of said first programs having said second necessity are composed on the basis of said first necessity.

* * * * *